(12) United States Patent
Palacharla et al.

(10) Patent No.: US 10,089,238 B2
(45) Date of Patent: Oct. 2, 2018

(54) METHOD AND APPARATUS FOR A SHARED CACHE WITH DYNAMIC PARTITIONING

(71) Applicant: QUALCOMM Incorporated, San Diego, CA (US)

(72) Inventors: Subbarao Palacharla, San Diego, CA (US); Moinul Khan, San Diego, CA (US); Alain Artieri, San Diego, CA (US); Kedar Bhole, San Diego, CA (US); Vinod Chamarty, San Diego, CA (US); Yanru Li, San Diego, CA (US); Raghu Sankuratri, San Diego, CA (US); George Patsilaras, Del Mar, CA (US); Pavan Kumar Thirunagari, Sunnyvale, CA (US); Andrew Edmund Turner, San Diego, CA (US); Jeong-Ho Woo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/334,010

(22) Filed: Jul. 17, 2014

(65) Prior Publication Data

US 2016/0019158 A1    Jan. 21, 2016

(51) Int. Cl.
*G06F 12/00* (2006.01)
*G06F 12/0893* (2016.01)
(Continued)

(52) U.S. Cl.
CPC ............ *G06F 12/0893* (2013.01); *G06F 9/50* (2013.01); *G06F 12/084* (2013.01);
(Continued)

(58) Field of Classification Search
CPC ............... G06F 12/084; G06F 12/0893; G06F 2212/1021; G06F 2212/1044;
(Continued)

(56) References Cited

U.S. PATENT DOCUMENTS 5,434,992 A    7/1995  Mattson
5,550,995 A *  8/1996  Barrera ............... G06F 12/1045
                                                         711/128
(Continued)

FOREIGN PATENT DOCUMENTS

EP    0642086 B1    3/1998
EP    1840766 B1    12/2012
(Continued)

OTHER PUBLICATIONS

International Search Report and Written Opinion—PCT/US2015/037670—ISA/EPO—dated Sep. 22, 2015.
(Continued)

*Primary Examiner* — Mardochee Chery
(74) *Attorney, Agent, or Firm* — The Marbury Law Group, PLLC

(57) ABSTRACT

Aspects include computing devices, systems, and methods for dynamically partitioning a system cache by sets and ways into component caches. A system cache memory controller may manage the component caches and manage access to the component caches. The system cache memory controller may receive system cache access requests and reserve locations in the system cache corresponding to the component caches correlated with component cache identifiers of the requests. Reserving locations in the system cache may activate the locations in the system cache for use by a requesting client, and may also prevent other client from using the reserved locations in the system cache. Releasing the locations in the system cache may deactivate the locations in the system cache and allow other clients to use them. A client reserving locations in the system cache may change the amount of locations it has reserved within its component cache.

32 Claims, 21 Drawing Sheets

| Component Cache Identifier | Validity Indicator | Set Shift | Set Offset | Target Ways | Probe All Ways | Index Mode | Replacement Policy | Cache Line Size |
|---|---|---|---|---|---|---|---|---|
| 0 | 1 | 0 | 000 | 0xFF | 1 | 0 (PI) | 0 (MRU) | 128 Bytes |
| 1 | 1 | 3 | 100 | 0x0C | 0 | 1 (CI) | 1 (FIFO) | 32 Bytes |
| 2 | 1 | 1 | 000 | 0xF0 | 1 | 0 (PI) | 2 (Random) | 256 Bytes |
| 3 | 1 | 2 | 110 | 0x78 | 1 | 0 (PI) | 0 (MRU) | 128 Bytes |
| 4 | 1 | 0 | 000 | 0x01 | 0 | 0 (PI) | 0 (FIFO) | 128 Bytes |
| . | . | . | . | . | . | . | . | . |
| N-1 | ... | ... | ... | ... | ... | ... | ... | ... |

(51) Int. Cl.
  *G06F 12/084* (2016.01)
  *G06F 12/0895* (2016.01)
  *G06F 9/50* (2006.01)
  *G06F 12/0888* (2016.01)
  *G06F 12/0864* (2016.01)
  *G06F 1/32* (2006.01)
  *G06F 17/30* (2006.01)

(52) U.S. Cl.
  CPC ........ *G06F 12/0895* (2013.01); *G06F 1/3203* (2013.01); *G06F 1/3275* (2013.01); *G06F 1/3287* (2013.01); *G06F 12/0864* (2013.01); *G06F 12/0888* (2013.01); *G06F 17/30902* (2013.01); *G06F 2212/1028* (2013.01); *G06F 2212/1044* (2013.01); *G06F 2212/152* (2013.01); *G06F 2212/601* (2013.01); *G06F 2212/6042* (2013.01); *Y02D 10/13* (2018.01)

(58) Field of Classification Search
  CPC ........... G06F 2212/601; G06F 12/0848; G06F 12/0895; G06F 12/0888; G06F 2212/1028; G06F 1/3203; G06F 1/3275; G06F 1/3287; G06F 17/30902; G06F 12/0864; G06F 11/1438; G06F 12/0846; Y02D 10/13
  USPC .................................................. 711/128, 146
  See application file for complete search history.

(56) References Cited

U.S. PATENT DOCUMENTS

| | | | |
|---|---|---|---|
| 5,781,926 A | 7/1998 | Gaskins et al. | |
| 5,829,024 A | 10/1998 | Sato | |
| 5,829,027 A * | 10/1998 | Goodrum ............ | G06F 12/0811 711/122 |
| 7,558,920 B2 | 7/2009 | Mattina et al. | |
| 7,613,898 B2 | 11/2009 | Hummel et al. | |
| 7,685,401 B2 | 3/2010 | Sugumar et al. | |
| 8,250,303 B2 * | 8/2012 | Bernstein ............ | G06F 12/0886 711/118 |
| 8,386,749 B2 | 2/2013 | Dannowski et al. | |
| 8,533,399 B2 | 9/2013 | Ohmacht | |
| 8,566,529 B2 * | 10/2013 | Hutton ................. | G06F 12/122 703/21 |
| 8,739,159 B2 | 5/2014 | Lin et al. | |
| 8,943,274 B2 * | 1/2015 | Spengler ............. | G06F 12/0223 711/129 |
| 9,075,893 B1 * | 7/2015 | Jenkins ............. | G06F 17/30902 |
| 2004/0181645 A1 * | 9/2004 | Wright ................ | G06F 12/0875 711/210 |
| 2005/0268037 A1 * | 12/2005 | Hama ................. | G06F 11/3452 711/118 |
| 2009/0216953 A1 * | 8/2009 | Rossi .................... | G06F 12/084 711/128 |
| 2010/0115233 A1 | 5/2010 | Brewer et al. | |
| 2011/0199977 A1 * | 8/2011 | Hammell ............ | H04L 63/0272 370/328 |
| 2011/0225370 A1 * | 9/2011 | So ....................... | G06F 12/0246 711/135 |
| 2012/0215959 A1 * | 8/2012 | Kwon ................. | G06F 12/0846 711/3 |
| 2012/0246408 A1 | 9/2012 | Yamamura et al. | |
| 2013/0111489 A1 | 5/2013 | Glew et al. | |
| 2014/0082284 A1 * | 3/2014 | Abella Ferrer ..... | G06F 12/0864 711/119 |
| 2015/0149413 A1 * | 5/2015 | Lee .................... | G06F 17/3038 707/643 |
| 2015/0220436 A1 * | 8/2015 | Cooray ................ | G06F 12/10 711/122 |

FOREIGN PATENT DOCUMENTS

| | | |
|---|---|---|
| JP | S63106849 A | 5/1988 |
| JP | H07319771 A | 12/1995 |
| JP | 2008234320 A | 10/2008 |
| JP | 2009217616 A | 9/2009 |
| JP | 2010026716 A | 2/2010 |
| JP | 2012203729 A | 10/2012 |
| WO | 2010017020 A1 | 2/2010 |
| WO | 2013169836 A1 | 11/2013 |

OTHER PUBLICATIONS

Rivers J.A., "Sectored Cache Performance Evaluation: A Case Study on the KSR-1 Data Subcache," Advanced Computer Architecture Lab EECS Dept, the University of Michigan, Oct. 1996, 13 Pages.

* cited by examiner

| Component Cache Identifier | Validity Indicator | Set Shift | Set Offset | Target Ways | Probe All Ways | Index Mode | Replacement Policy | Cache Line Size |
|---|---|---|---|---|---|---|---|---|
| 0 | 1 | 0 | 000 | 0xFF | 1 | 0 (PI) | 0 (MRU) | 128 Bytes |
| 1 | 1 | 3 | 100 | 0x0C | 0 | 1 (CI) | 1 (FIFO) | 32 Bytes |
| 2 | 1 | 1 | 000 | 0xF0 | 1 | 0 (PI) | 2 (Random) | 256 Bytes |
| 3 | 1 | 2 | 110 | 0x78 | 1 | 0 (PI) | 0 (MRU) | 128 Bytes |
| 4 | 1 | 0 | 000 | 0x01 | 0 | 0 (PI) | 0 (FIFO) | 128 Bytes |
| ... | ... | ... | ... | ... | ... | ... | ... | ... |
| N-1 | | | | | | | | |

FIG. 5

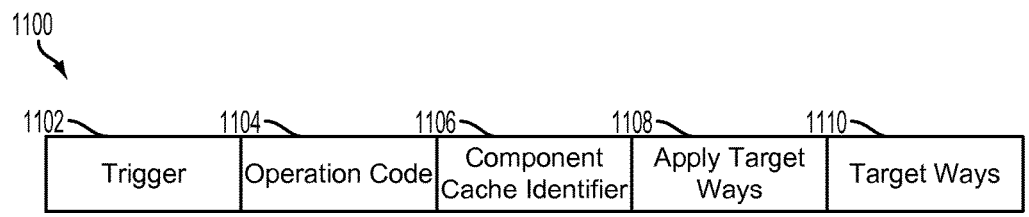
FIG. 11
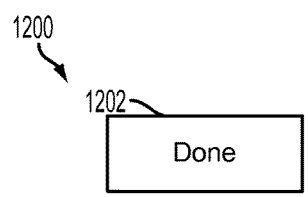
FIG. 12
| Component Cache Identifier | Active Ways |
|---|---|
| 1 | 0x0C |
| 2 | 0x0F |
| 3 | 0x78 |
| 4 | 0x01 |
FIG. 13

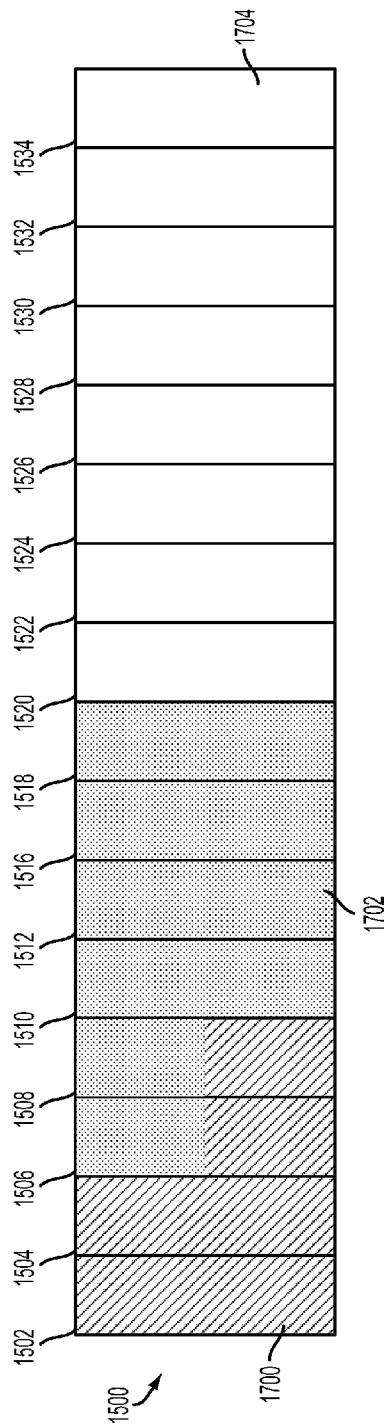
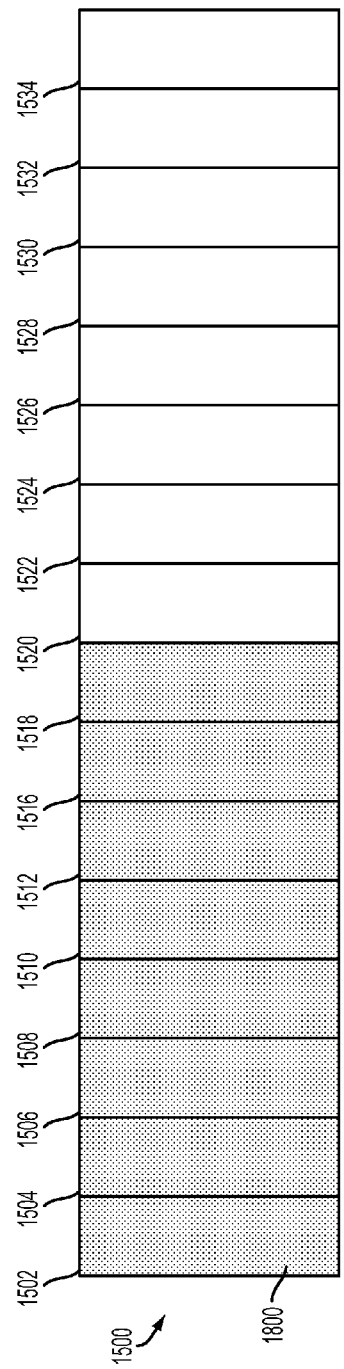

METHOD AND APPARATUS FOR A SHARED CACHE WITH DYNAMIC PARTITIONING

RELATED APPLICATIONS

This application is related to U.S. patent application Ser. No. 14/333,981 entitled "Method and Apparatus For Flexible Cache Partitioning By Sets And Ways Into Component Caches" filed concurrently herewith, the entire contents of which are hereby incorporated by reference.

BACKGROUND

Cache partitioning to serve multiple client processes ("clients") in computing systems has several benefits. Partition size can vary to match performance requirements of the client. Clients experience robust performance since data in its private cache is not subject to evictions due to other clients' accesses. Idle partitions can be turned off to reduce power consumption. However, these benefits are not as great as they could be due to limitations imposed by the way current cache partitioning is accomplished.

Currently caches may be partitioned across cache ways only, which has a number of limitations. The cache partition number is limited by the number of cache ways, and adding associativity to the cache partitions to reduce cache conflicts reduces the maximum number of cache partitions possible. Minimum way partition size is determined by the associativity. For example, the smallest partition for an 8 MB cache with 8 ways that is 8-way associative is 1 MB. Also, smaller cache partitions could result in loss of cache space due to fragmentation. Using the same example, 512 KB of data stored in the smallest 1 MB cache partition would result in 512 KB of unused space in the cache partition. Minimum way partition power collapse granularity is determined by the associativity. In the same example, the minimum granularity that can be power collapsed is a 1 MB cache partition. The size of collapse granularity affects power savings/usage, especially if a shared system cache replaces multiple private memories that can be independently power collapsed.

Another problem faced in mobile system on chip (SoC) computing systems is the diverse access patterns generated by subsystems. For example, the multimedia subsystems, like video and graphics, have longer access times and benefit from longer cache lines, while the accesses from the applications central processing unit (CPU) are more random and sensitive to latency and thus benefit from smaller cache lines and higher associativity. Not all of the potential access patterns work well with current cache partitioning that relies on way cache partitioning. Conventional cache partitioning provides one-size caches for all applications and subsystems. The size of the cache partitions may benefit certain access patterns more than others. Another example is the producer-to-consumer access pattern seen between an image processing engine and a display engine, which may benefit from a first in first out (FIFO) replacement policy. However, a cache holding the transit data between the engines may use an inefficient replacement policy for the application.

SUMMARY

The methods and apparatuses of various aspects provide circuits and methods for dynamically partitioning a system cache, which may include receiving a system cache access request including a component cache identifier from a client, retrieving a set shift trait and a set offset trait from a component cache configuration table correlated with the component cache identifier in the component cache configuration table, and activating locations in the system cache correlating to at least a portion of a group of ways of a component cache within a group of sets indicated by the set shift trait and the set offset trait.

In an aspect, activating the locations in the system cache correlating to at least the portion of the group of ways of the component cache within the group of sets indicated by the set shift trait and the set offset trait may include reserving the locations in the system cache. In an aspect, reserving the locations in the system cache may include setting reserved indicators in a component cache reserve table for the locations in the system cache.

An aspect method may further include updating the reserved indicators to change a number of locations reserved in the system cache correlating to an updated portion of the group of ways and the group of sets.

An aspect method may further include updating a component cache active ways table with an indication of the portion of the group of ways of the component cache that are active, in which reserving the locations in the system cache may include reserving the ways of the indication of component cache active ways table.

An aspect method may further include preventing another client from accessing the locations in the system cache. An aspect method may further include releasing at least a portion of the locations in the system cache, and deactivating locations in the system cache correlating to the released locations in the system cache.

In aspect, the component cache identifier may be a first component cache identifier and the component cache may be a first component cache, and the method may further include loading a bonus vector for at least the first component cache identifier configured to indicate one or more ways for the first component cache associated with the first component cache identifier to expand into, receiving a reserved vector for at least the first component cache identifier configured to indicate one or more ways to be reserved for the first component cache, determining whether one or more ways of the reserved vector are reserved by a second component cache, deactivating the second component cache to unreserve the one or more ways reserved by the second component cache in response to determining that the second component cache has reserved one or more ways of the reserved vector, determining whether using the first component cache may include using one or more of the ways of the bonus vector, determining whether one or more ways of the bonus vector are reserved by the second component cache in response to determining that the request to use the first component cache may include the use of one or more of the ways of the bonus vector, deactivating the second component cache to unreserve the one or more ways reserved by the second component cache in response to determining that the second component cache has reserved one or more ways of the bonus vector, and reserving one or more unreserved ways for the first component cache.

An aspect includes a computing device having a processor, a system cache memory, and a system cache controller communicatively connected to each other in which the system cache controller is configured to perform operations of one or more of the aspect methods described above.

An aspect includes a non-transitory processor-readable medium having stored thereon processor-executable software instructions to cause a processor and a system cache controller to perform operations of one or more of the aspect methods described above.

An aspect includes a computing device having means for performing functions of one or more of the aspect methods described above.

BRIEF DESCRIPTION OF THE DRAWINGS

The accompanying drawings, which are incorporated herein and constitute part of this specification, illustrate example aspects of the invention, and together with the general description given above and the detailed description given below, serve to explain the features of the invention.

FIG. 5 is a schematic diagram illustrating an example component cache configuration table in accordance with an aspect.

FIG. 11 is a component block diagram illustrating an example component cache activate/deactivate control command suitable for implementing an aspect.

FIG. 12 is a component block diagram illustrating an example component cache activate/deactivate control status suitable for implementing an aspect.

FIG. 13 is a schematic diagram illustrating an example component cache active ways table in accordance with an aspect.

FIG. 17 is a schematic diagram illustrating an example system cache memory having reserved cache ways allocated to various component caches in accordance with an aspect.

FIG. 18 is a schematic diagram illustrating an example system cache memory having reserved and bonus cache ways allocated to a component cache in accordance with an aspect.

DETAILED DESCRIPTION

Figure 1:
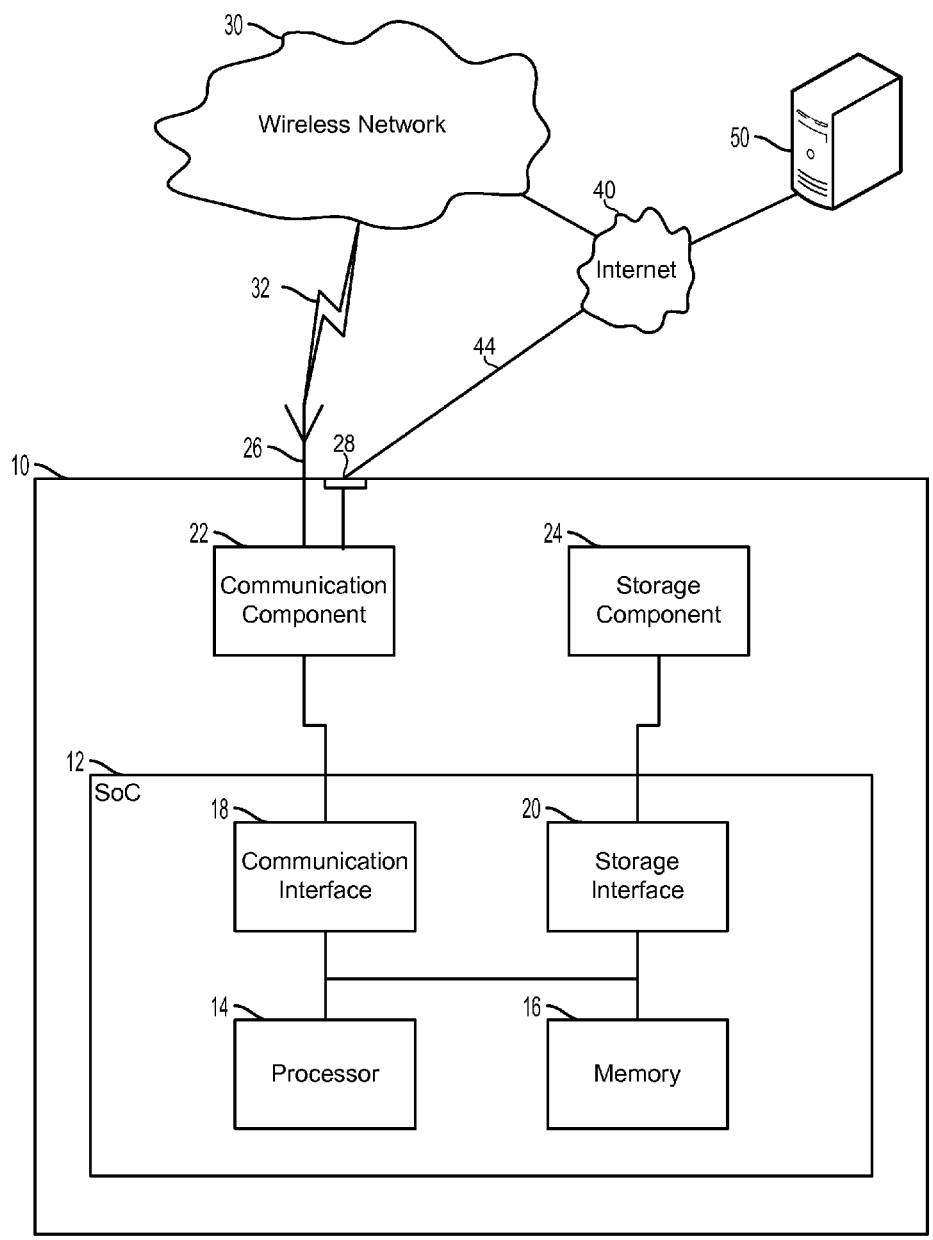
FIG. 1 is a component block diagram illustrating a computing device suitable for implementing an aspect.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The terms "computing device" and "mobile device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices that include a memory, and a programmable processor. While the various aspects are particularly useful for mobile computing devices, such as smartphones, which have limited energy resources, the aspects are generally useful in any electronic device that implements a plurality of memory devices and a limited energy budget where reducing the power consumption of the memory devices can extend the battery-operating time of the mobile computing device.

The term "system-on-chip" (SoC) is used herein to refer to a set of interconnected electronic circuits typically, but not exclusively, including a hardware core, a memory, and a communication interface. A hardware core may include a variety of different types of processors, such as a general purpose processor, a central processing unit (CPU), a digital signal processor (DSP), a graphics processing unit (GPU), an accelerated processing unit (APU), an auxiliary processor, a single-core processor, and a multi-core processor. A hardware core may further embody other hardware and hardware combinations, such as a field programmable gate array (FPGA), an application-specific integrated circuit (ASCI), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

In an aspect, the methods for partitioning a cache enable partitioning across the cache ways and across the cache sets to create component caches, which are smaller component caches than achievable with convention methods for creating component caches. A component cache configuration table may store parameters of each component cache defining the features of the component caches, including parameters for the total number or size of the sets, the location of the set that the component cache occupies, the ways that the component cache occupies, whether the component cache is accessed using a custom index (e.g., derived from a virtual address) or set index derived from a physical address (index mode), and a replacement policy for the component cache. The component cache configuration table may populate dynamically as clients request cache access, or the component cache configuration table may populate at boot time, defining a number of component caches, and remain static at runtime. Each component cache is given a component cache identifier that corresponds to a group of parameters for the component cache identifier in the component cache configuration table.

To access a way and set partitioned component cache, a client may request access over a bus interconnect to a system cache partitioned into component caches. The access request may include a physical address in the system memory and a component cache identifier. A system cache controller may look up the parameters for the component cache identifier in the component cache configuration table. The parameters defining the number or size of the sets in the system cache, the location of the set the component cache occupies in the system cache, and the index mode for the component cache may be read from the component cache configuration table. The system cache controller may calculate the set index and tag for the system cache access. The index mode may determine whether the physical address or the custom index is used to calculate the location in the system cache. In either case, the offset may be derived directly from a number of least significant bits of the physical address or from the custom index. Some bits of a middle portion of the physical address determined by the parameter indicating the number or size of sets may be discarded, and the discarded bits may be replaced by the parameter indicating the location of the set that the component cache occupies to determine the set index. The bits of the newly formed middle portion of the physical address may be reordered. The tag may include the most significant bits of the physical address appended with the discarded bits.

A system cache controller may instantiate component caches (partitions of a system cache) at run time. The cache memory controller may activate and deactivate component caches based on the task requests of a client of a device. A client may request activation of a component cache for a task, and a component cache activate/deactivate control command register may send parameters for the component cache activation to the system cache controller. These parameters stored in the register may include a bit to trigger the operation, an operation code to activate and deactivate the component cache, component cache identifiers that may be used to identify the configuration of the component cache, a target ways parameter specifying the target ways to be used in the component cache, and a bit to apply the operation information to the target ways.

The activation of a component cache may result in a reservation of the component cache. The activation may specify the cache ways designated for use by the client for a task. The system cache controller may reserve the lines of the system cache corresponding to the component cache, and particularly the designated ways of the component cache, for use by the requesting client. The reservation may result in the cache controller setting reservation bits to note that a section of the cache is reserved for a master activating the component cache. The cache lines of the component cache may be written when the master issues writes targeted to the component cache. Reserving the component cache avoids conflicts with other clients wanting to write data to the reserved lines of the component cache. A component cache active ways table may be used to indicate the cache ways that are active and used to avoid clients conflicting by attempting to allocate lines to the same occupied component cache. A component cache activate/deactivate control status register may indicate whether a task is completed. The reserved space of the component cache, specified in part by the targeted cache ways, may be dynamically altered to support the task of the client when the task requires more or less cache memory. Upon completion of the task, the cache memory controller may deactivate the component cache, making the previously reserved section of the sub-cache available for any client to use. The component cache may occupy contiguous portions of the system cache, or may occupy non-contiguous portions of the system cache.

FIG. 1 illustrates a system including a computing device 10 in communication with a remote computing 50 suitable for use with the various aspects. The computing device 10 may include an SoC 12 with a processor 14, a memory 16, a communication interface 18, and a storage interface 20. The computing device may further include a communication component 22 such as a wired or wireless modem, a storage component 24, an antenna 26 for establishing a wireless connection 32 to a wireless network 30, and/or the network interface 28 or connecting to a wired connection 44 to the Internet 40. The processor 14 may include any of a variety of hardware cores, as well as a number of processor cores. The SoC 12 may include one or more processors 14. The computing device 10 may include more than SoCs 12, thereby increasing the number of processors 14 and processor cores. The computing device 10 may also include processor cores 14 that are not associated with an SoC 12. Individual processors 14 may be multi-core processors as described below with reference to FIG. 2. The processors 14 may each be configured for specific purposes that may be the same as or different from other processors 14 of the computing device 10. One or more of the processors 14 and processor cores of the same or different configurations may be grouped together as part of one or more subsystems of the computing device 10 as described below with reference to FIG. 3.

The memory 16 of the SoC 12 may be a volatile or non-volatile memory configured for storing data and processor-executable code for access by the processor 14. In an aspect, the memory 16 may be configured to store data structures at least temporarily, such as a table for managing component caches of a cache memory partitioned by sets and ways as described below with reference to FIGS. 5, 13, and 14. As discussed in further detail below, each of the processor cores may access a variety of component caches of a cache memory.

The computing device 10 and/or SoC 12 may include one or more memories 16 configured for various purposes. In an aspect, one or more memories 16 may be configured to be dedicated to storing the data structures for storing component cache information in a manner that enables the data structure information to be accessed for managing component cache access requests by the processors 14. When the memory 16 storing the data structures is non-volatile, the memory 16 may retain the information of the data structures even after the power of the computing device 10 has been shut off. When the power is turned back on and the computing device 10 reboots, the information of the data structures stored in non-volatile memory 16 may be available to the computing device 10.

The communication interface 18, communication component 22, antenna 26 and/or network interface 28, may work in unison to enable the computing device 10 to communicate over a wireless network 30 via a wireless connection 32, and/or a wired network 44 with the remote computing device 50. The wireless network 30 may be implemented using a variety of wireless communication technologies, including, for example, radio frequency spectrum used for wireless communications, to provide the computing device 10 with a connection to the Internet 40 by which it may exchange data with the remote computing device 50.

The storage interface 20 and the storage component 24 may work in unison to allow the computing device 10 to store data on a non-volatile storage medium. The storage component 24 may be configured much like an aspect of the memory 16 in which the storage component 24 may store the data structures, such that the data structures information may be accessed by one or more processors 14. The storage component 24, being non-volatile, may retain the data structures information even after the power of the computing device 10 has been shut off. When the power is turned back on and the computing device 10 reboots, the data structures information store on the storage component 24 may be available to the computing device 10. The storage interface 20 may control access to the storage device 24 and allow the processor 14 to read data from and write data to the storage device 24.

Some or all of the components of the computing device 10 may be differently arranged and/or combined while still serving the necessary functions. Moreover, the computing device 10 may not be limited to one of each of the components, and multiple instances of each component may be included in various configurations of the computing device 10.

Figure 2:
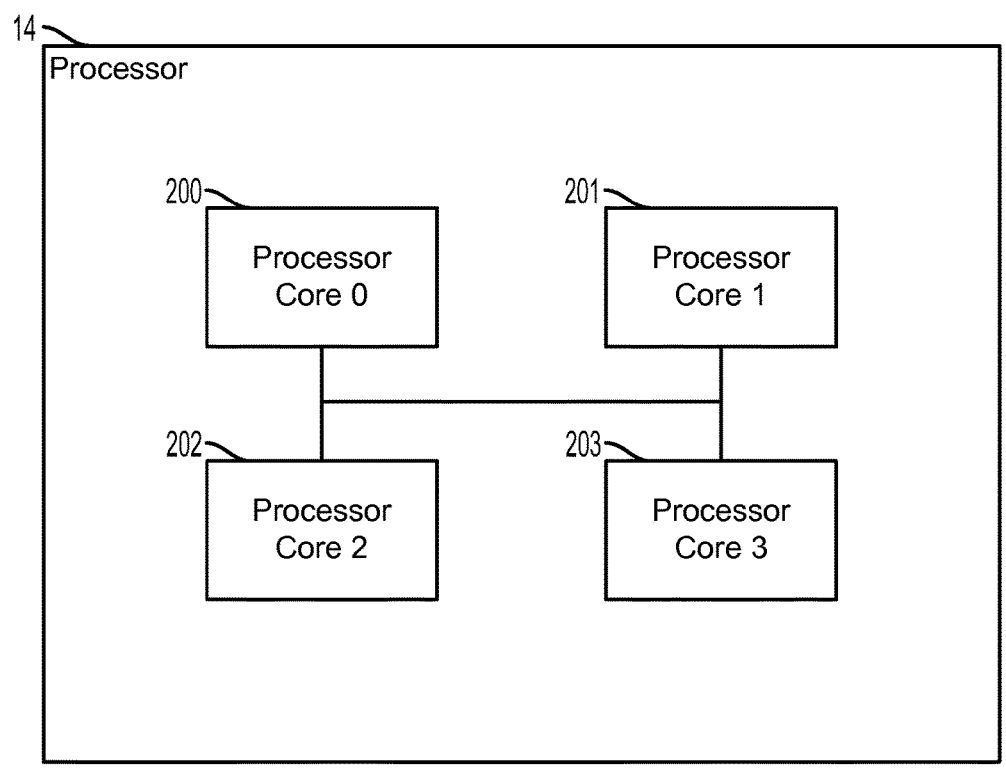
FIG. 2 is a component block diagram illustrating an example multi-core processor suitable for implementing an aspect.

FIG. 2 illustrates a multi-core processor 14 suitable for implementing an aspect. The multi-core processor 14 may have a plurality of equivalent processor cores 200, 201, 202, 203. The processor cores 200, 201, 202, 203 may be equivalent in that, the processor cores 200, 201, 202, 203 of a single processor 14 may be configured for the same purpose and have the same or similar performance characteristics. For example, the processor 14 may be a general purpose processor, and the processor cores 200, 201, 202, 203 may be equivalent general purpose processor cores. Alternatively, the processor 14 may be a graphics processing unit or a digital signal processor, and the processor cores 200, 201, 202, 203 may be equivalent graphics processor cores or digital signal processor cores, respectively. Through variations in the manufacturing process and materials, the performance characteristics of the processor cores 200, 201, 202, 203 may differ from processor core to processor core within the same multi-core processor 14 or within another multi-core processor 14 using the same designed processor cores. In the example illustrated in FIG. 2, the multi-core processor 14 includes four processor cores 200, 201, 202, 203 (i.e., processor core 0, processor core 1, processor core 2, and processor core 3). For ease of explanation, the examples herein may refer to the four processor cores 200, 201, 202, 203 illustrated in FIG. 2. However, it should be noted that the four processor cores 200, 201, 202, 203 illustrated in FIG. 2 and described herein are merely provided as an example and in no way are meant to be limiting. The computing device 10, the SoC 12, or the multi-core processor 14 may individually or in combination include fewer or more than the four processor cores 200, 201, 202, 203 illustrated and described herein.

Figure 3:
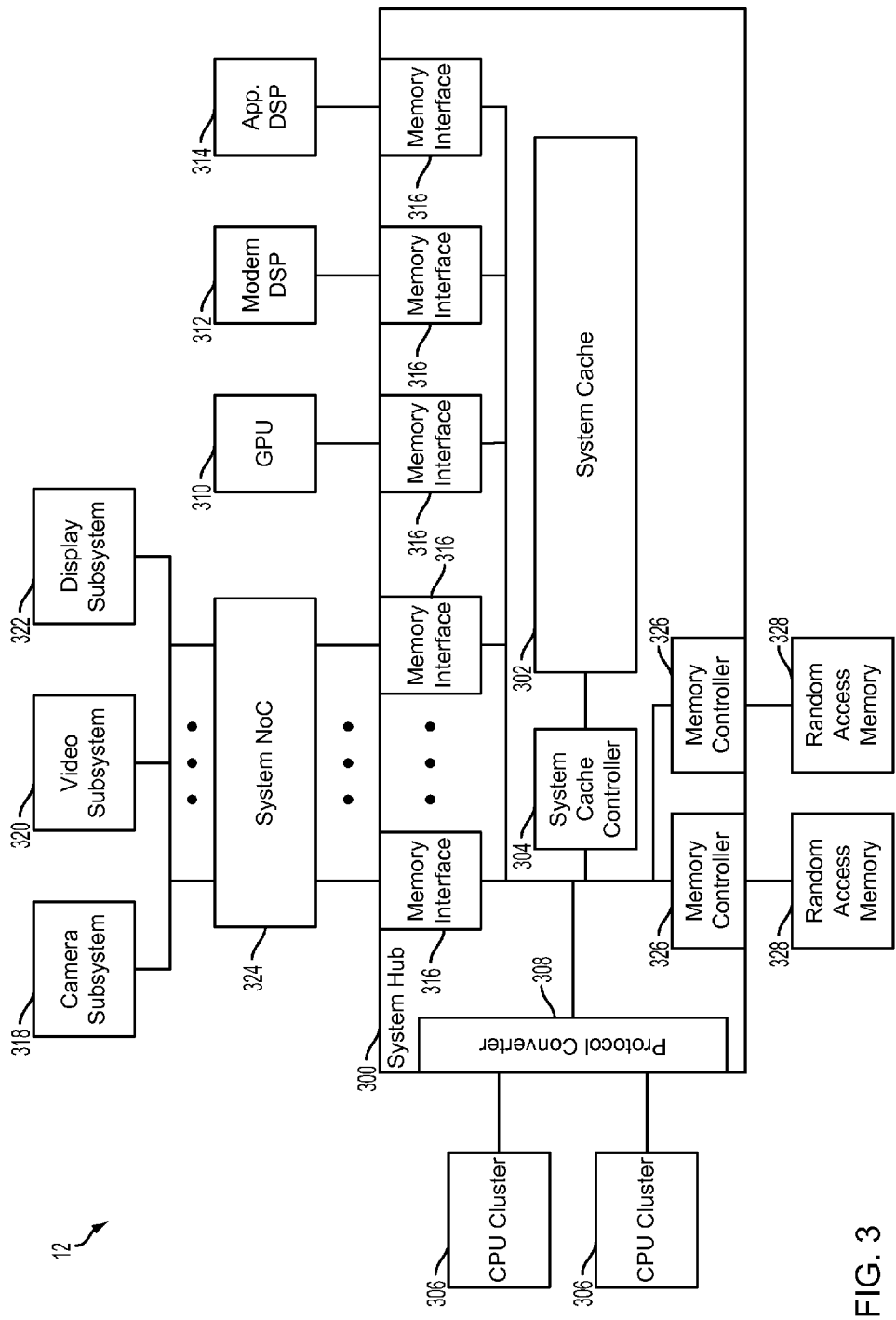
FIG. 3 is a component block diagram illustrating a computing device suitable for partitioning cache memory by sets and ways into component caches in accordance with an aspect.

FIG. 3 illustrates a computing device configured to partition cache memory by sets and ways into component caches. The SoC 12 may include a variety of components as described above. Some such components and additional components may be employed to implement the component caches. For example, an SoC 12 configured to implement component caches may include a system hub 300, a system cache 302, a system cache controller 304, a CPU cluster 306, a protocol converter 308, a GPU 310, a modem DSP 312, an application DSP 314, a memory interface 316, a camera subsystem 318, a video subsystem 320, a display subsystem 322, a system network on chip (NoC) 324, a memory controller 326, and a random access memory (RAM) 328. The system hub 300 may be a component of the SoC 12 that manages access to the various memories by the various processors 308, 210, 312, 314. In an aspect the system hub 300 may manage accesses to the system cache 302 of the SoC 12 and also to the RAM 328. Some of the processors that may access the various memories may be included in the CPU clusters 306 and the various subsystems, such as the camera, video, and display subsystems 318, 320, 322, and may also include other specialized processors such as the GPU 310, the modem DSP 312, and the application DSP 314.

The system cache 302 may be a shared memory device in the SoC 12 used to replace or supplement cache memories that may be associated with the various processors and/or subsystems. The system cache 302 may centralize the cache memory resources of the SoC 12 so that the various processors and subsystems may access the system cache 302 to read and write program commands and data designated for repeated and/or quick access. The system cache 302 may store data from the various processors and subsystems, and also from other memory devices of the computing device, such as main memory, the RAM 328, and the storage device (e.g., a hard disk drive). In an aspect, the system cache 302 may be backed up by such memory and storage devices in case a cache miss occurs because an item requested from the system cache 302 cannot be located. In an aspect, the system cache 302 may be used as scratchpad memory for the various processors and subsystems. The system cache 302 may be smaller in storage space and physical size than a combination of the local cache memories of an SoC of similar an architecture that does not employ a system cache 302. However, management of the system cache 302 as described further herein may allow for greater energy conservation and equal or better performance speed of the SoC 12 despite of the system cache's smaller storage space and physical size.

The system cache controller 304 may manage access to the system cache 302 by the various processors and subsystems. Part of the access management of the system cache 302 may include partitioning the system cache memory space by both ways and sets. Partitioning the system cache memory space by both ways and sets may result in partitioning the system cache memory space into component caches of various sizes and locations in the system cache memory space. The system cache controller 304 may maintain records of these component caches and relate various traits/features/parameters to each of the component caches as described further herein.

The system cache controller 304 may receive system cache access requests specifying particular component caches. The system cache access requests may also include traits of the component cache of the system cache access requests. In an aspect, the traits of the component cache may be received separately in a component cache configuration request, on the same or on a different communication bus, by the system cache controller 304. The component cache configuration request may be a standalone signal or may be associated with a system cache access request. The component cache configuration request may be received by the system cache controller 304 as a component of a system cache access request. For ease of explanation, the following examples are described in terms of the component cache traits being received as part of the system cache access request, which is not meant to limit the manner by which the system cache controller 304 may receive the component cache traits. It should be understood that the component cache traits may be received via various associated or independent signals.

The system cache controller 304 may use the information of the specified component cache and the related traits to control access to, update and/or create, and reserve the component cache and its related records. In an aspect, the system cache controller 304 may dynamically partition the system cache memory space into component caches based on system cache access requests from clients of the system cache 302. These clients may include the various processors and subsystems of the SoC 12.

The CPU clusters 306 may include groupings of several general purpose processors and/or general purpose processor cores. The CPU clusters 306 may access the system cache 302 via the system cache controller 304. Communications between the CPU clusters 306 and the system cache controller 304 may be converted by a protocol converter 308 from a standard or proprietary protocol of one of the CPU clusters 306 and the system cache controller 304 to a protocol suitable for the other in order to achieve interoperability between them. The CPU clusters 306 may send system cache access requests specifying a particular component cache and/or traits of the specified component cache to the system cache controller 304. In return, the system cache controller may update and/or create the records of the specified component cache, allow or deny access to the specified component cache, and return the information stored in the specified component cache to the CPU clusters 306.

Similar to the CPU clusters 306, specialized processors, like the GPU 310, the modem DSP 312, and the application DSP 314, may access the system cache 302 via the system cache controller 304. Communications between the specialized processors 310, 312, 314, and the system cache controller 304 may be managed by dedicated, individual memory interfaces 316. In an aspect memory interfaces 316 may manage communications between multiple similar or disparate specialized processors 310, 312, 314, and the system cache controller 304.

Various subsystems, like the camera subsystem 318, the video subsystem 320, and the display subsystem 322, may similarly access the system cache 302 via the system cache controller 304 and memory interfaces 316. The NoC 324 may manage the communication traffic between the subsystems 318, 320, 322, and the system hub 300 as well as other components of the SoC 12.

The system cache controller 304 may also manage accesses to the RAM 328 by the various processors and subsystems of the SoC 12. While the various processors and subsystems may make direct access requests to the RAM 328 via the memory controller 326, in certain instances system cache access requests may be directed to the RAM 328. In an aspect, system cache access requests may result in cache misses when the information requested from a specified component cache is not found in the specified component cache. As a result, the system cache controller 304 may direct the system cache access requests to the RAM 328 to retrieve the requested information not found in the component cache. In an aspect, the request for the information directed to the RAM 328 is first directed to the memory controller 326 that may control access to the RAM 328. The request for the information directed to the RAM 328 may be sent by the system cache controller 304, and the resulting information may be returned to the system cache controller 304 to be written to the component cache and returned from the component cache to the components making the system cache access requests. In an aspect, the resulting information may be returned directly, or via the system cache controller 304, to the components making the system cache access requests without being written to the component cache.

In some aspects, the cache memory controller 304 may be implemented and configured in firmware to perform operations of the aspect methods. In some aspects, the cache memory controller 304 may be a programmable controller that is configured by controller-executable instructions to perform operations of the aspect methods. In some aspects, the cache memory controller 304 may be implemented and configured through a combination of firmware and controller-executable instructions to perform operations of the aspect methods.

The descriptions herein of SoC 12 and its various components are only meant to be exemplary and in no way limiting. Several of the components of the SoC 12 may be variably configured, combined, and separated. Several of the components may be included in greater or fewer numbers, and may be located and connected differently within the SoC 12 or separate from the SoC 12. Similarly, numerous other components, such as other memories, processors, subsystems, interfaces, and controllers, may be included in the SoC 12 and in communication with the system cache controller 304 in order to access the system cache 302.

Figure 4:
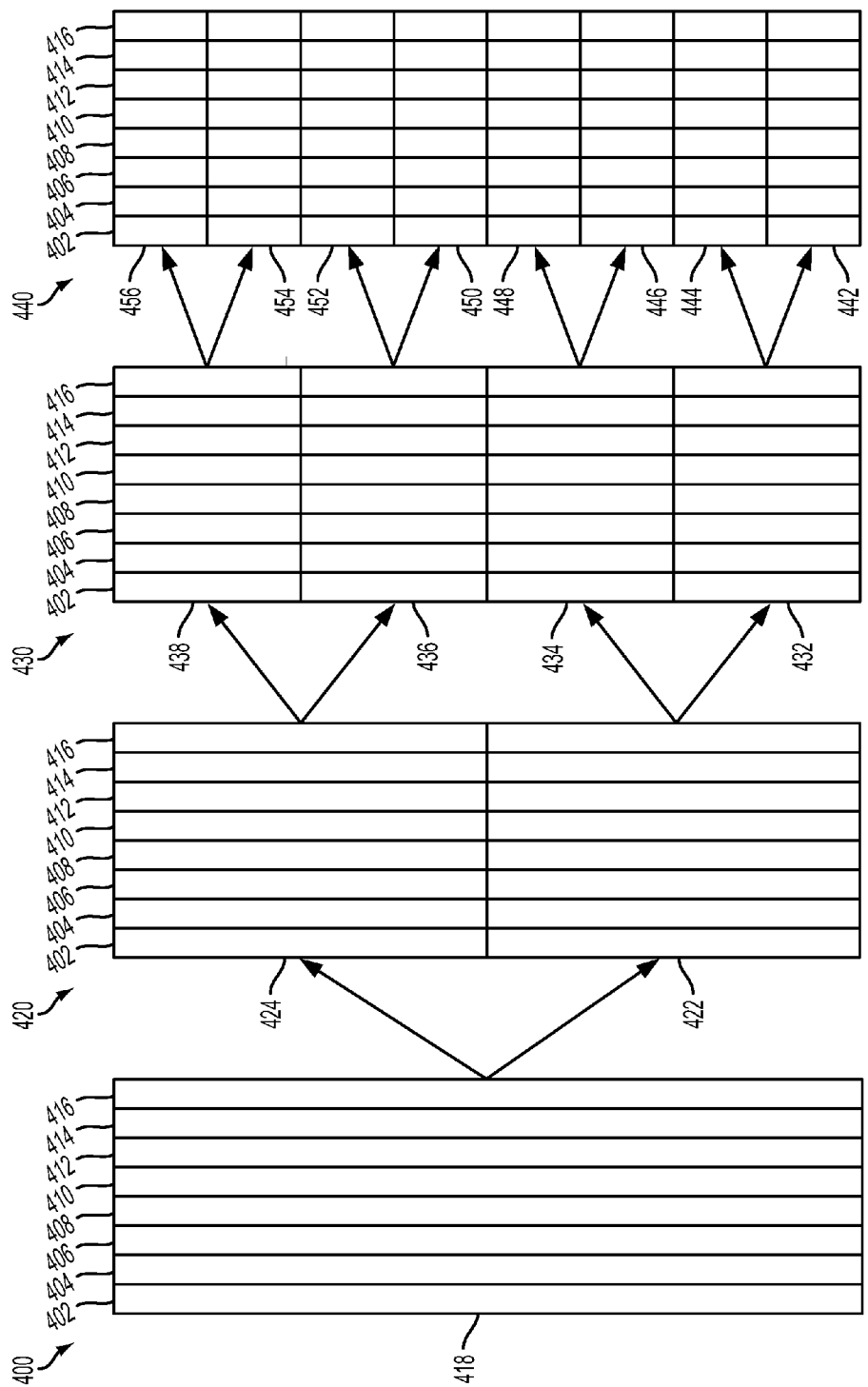
FIG. 4 is a schematic diagram illustrating an example cache memory variably partitioned by sets and ways to allow for component caches in accordance with an aspect.

FIG. 4 illustrates a system cache memory variably partitioned by sets and ways to allow for component caches. A system cache 400, such as the system cache described in FIG. 3 above, may be configured to include a number of ways 402, 404, 406, 408, 410, 412, 414, 416, and an N number of sets 418 where N is a positive integer. It is known to divide the system cache 400 by the ways 402-416. In this example, the system cache 400 includes eight ways 402-416, and dividing the system cache 400 by each of the eight ways 402-416 would result in a partitioned system cache 400 having eight partitions, each including one way 402-416 and all of the N sets 418 of the respective way 402-416. In an aspect, the system cache 400 may be partitioned using groups of ways 402-416 as well. Continuing with the example of the system cache 400 having eight ways 402-416, each partition may include two of the ways 402-416 resulting in four partitions, or four of the ways 402-416 resulting in two partitions.

In order to create a component cache, the system cache 400 may be additionally partitioned by a defined group of the N number of sets. In an aspect, a trait of the component caches used by the system cache controller may determine into how many set groups into which the N number of sets may be partitioned. In an aspect, this trait may be referred to as a set shift. For example, the system cache 400 is not partitioned into set groups, thus the set shift may be a value indicating no partitioning by set groups, such as a null value or zero. In another example, system cache 420 may be partitioned into two set groups 422, 424. The system cache 420 is the same system cache as the system cache 400, but the system cache 420 illustrates the system cache 400 when the set shift is a value indicating partitioning by two set groups 422, 424. For system cache 420, the system cache controller may manage the use of the system cache memory space using the extra component caches created by the partition of the system cache 420 by the two set groups 422, 424. The component caches may include partitions of the system cache 420 created by any combination of way partitions and the set group partitions, as described in further detail herein.

Similarly, system cache 430 may be the same as the system cache 400, except that the system cache 430 illustrates the system cache 400 when the set shift is a value indicating partitioning by four set groups 432, 434, 436, 438. Similarly, system cache 440 illustrates the system cache 400 when the set shift is a value indicating partitioning by eight set groups 442, 444, 446, 448, 450, 452, 454, 456. In each of these example system caches 430 and 440 illustrated in FIG. 4, the system cache controller may manage the use of the system cache memory space using the extra component caches created by partitioning the system caches 430, 440 by the four set groups 432, 434, 436, 438 or the eight set groups 442-456. The component caches in these examples may include partitions of the system caches 430, 440, created by any combination of way partitions and the set group partitions, as described in further detail herein.

Various forms of notation may be used to indicate the set shift, such as integers. In an aspect, the set shift trait indicating the number of set groups by which the system cache memory space is partitioned may indicate an incremental change in the number of set groups. For example, a change in the set shift trait value to indicate the next higher change in the number of set groups may indicate the incremental change of adding, multiplying, exponentially increasing, or increasing by some other function the number of set groups. For the example in FIG. 4, the number of set groups is a power of two, where the power is the set shift trait. The set groups may be equal in size and the number of sets per set group may also be a power of 2. It is conceivable that the number of sets can be a power of another number, which may require some hardware to be differently configured (like division by a non power of 2 integer) to calculate a set index as described further below.

In an aspect a trait of the component caches used by the system cache controller may determine in which of the set groups 422, 424, 432, 434, 436, 438, 442, 444, 446, 448, 450, 452, 454, 456 the component caches are located. In an aspect, this trait may be referred to as a set offset. Various forms of notation may be used to indicate the set offset.

Continuing with the example set groups described herein, the total number of set groups described is 14, not counting the N number of sets 418. For this example, the set offset may be a three bit binary code in which no set offset is needed when no set groups are implemented. When two set groups are implemented, the set groups 422, 424 correlate with the set offset=000 and 100, respectively. When four set groups are implemented, the set groups 432, 434, 436, 438 may correlate with the set offset=000, 010, 100, and 110, respectively. Similarly, when eight set groups are implemented, the set groups 442-456 may correlate with the set offset=000, 001, 010, 011, 100, 101, 110, and 111, respectively.

FIG. 5 illustrates a component cache configuration table 500 that may be used by the system cache controller to manage the traits of the various component caches. The component cache configuration table 500 may include a component cache identifier field 502, a validity indicator trait field 504, a set shift trait field 506, a set offset trait field 508, a target ways trait field 510, a probe always trait field 512, an index mode trait field 514, a replacement policy trait field 516, and a cache line size trait field 528. Each component cache of the system cache may be correlated with an individual component cache identifier as shown in the component cache identifier trait field 502.

The component cache identifier may be received by the system cache controller in a system cache access request from a client on the SoC, and used by the system cache controller to match the system cache access request with the correct component cache and its traits. In an aspect, when a component cache identifier is received that does not exist in the component cache configuration table 500, the system cache controller may update the component cache configuration table 500 to include the received component cache identifier.

In an aspect, the received component cache identifier may exist in the component cache configuration table 500, but one or more of the other component cache traits correlated with the component cache identifier may not match the component cache traits received with the received component cache identifier. In such a circumstance, the system cache controller may update the component cache traits in the component cache table 500 correlated with the component cache identifier using the received component cache traits. Various notations may be used to symbolize a value of the component cache identifier in the component cache identifier field 502.

Each component cache of the system cache may be correlated with a validity indicator, as shown in the validity indicator trait field 504, and may be used to indicate a valid entry for the correlated component cache in the component cache configuration table 500. For various situations, a record of a component cache may be marked as being valid or invalid, such as with a value or flag correlated to a valid or invalid condition (e.g., "0" or "1"). A system cache access request for a component cache identifier correlated with a valid identifier in the validity indicator trait field 504 may be allowed by the system cache controller. When the system cache access request for a component cache identifier correlated with an invalid identifier in the validity indicator trait field 504 is received, the system cache controller may treat the system cache access request as an error.

The set shift trait field 506 in the component cache configuration table 500 may be used to indicate the set shift trait as described above. As described above, the set shift identifies the number of set groups into which the system cache memory space is divided for each of the component caches correlated with the respective set shift value. For example, there may be numerous component caches made up of various combinations of set and way partitions for a set shift indicating only two set group partitions. For example, in FIG. 5, row 522 includes set shift=1, which in this example indicates two set group partitions. Row 522 represents just one of the component cache set and way partitions, including one value in the set offset trait field 508 and one value in the target ways trait field 510. There may be numerous other combinations of just the same value in the set offset trait field 508 with other values in the target ways trait field 510 correlated with the same value in the set shift trait field 506. Even more combinations are possible for the other value possible for the set offset trait field 508 representing the other of the two set group partitions indicated by set shift=1 in the set shift trait field 506. Similar examples include larger numbers of combinations of set and way partitions of the different component caches for other possible values in the set shift trait field 506. In an aspect, known partitions of the system cache (i.e., the entire caches or way only cache partitions) may be included in the component cache configuration table 500. Whereas the component cache configuration table 500 was previously unnecessary for these known partitions because they do not include partitions of the system cache by sets, these known partitions may be included in the component cache configuration table 500. The known partitions of the system cache may be defined in the component cache configuration table 500 when the set shift trait field 506 includes set shift=0 or a null value, as in rows 518 and 526. This set shift value may indicate that the component cache associated with it is not portioned by sets. Component caches partitioned by sets may be associated with set shift values greater than zero. Various notations may be used to symbolize a value of the set shift in the component set shift trait field 506.

The set offset trait field 508 in the component cache configuration table 500 may be used to indicate the set offset trait that may indicate the set group in which the correlated component cache resides. As discussed above, the component cache is partly made of a set group partition in combination with a way partition. The set shift trait may identify the number of set group partitions and the set offset trait may indicate the particular set group within that number of set group petitions that contains the correlated component cache. As discussed above, each set group may be correlated with a specific set offset trait value to be represented in the component cache configuration table 500 in the set offset trait field 508. More specifically, in an aspect the combination of the set shift and the set offset may define the set group that contains the component cache because set offset values for one set shift value may overlap with set offset values for another set shift value. For example, every set shift may include a set offset=000, which may correlate to a first set group. This is because, for each set shift value indicating multiple set groups, there is at least a first set group. Thus, the set offset=000 for the set shift=1 may represent a different set group for set offset=000 for another set shift value. It is also possible to assign a unique set offset value to the various possible set groups. Various notations may be used to symbolize a value of the set offset in the component set offset trait field 508.

The target ways trait field 510 in the component cache configuration table 500 may be used to indicate a target ways trait that may indicate a way group partition in which the correlated component cache resides. Much like the set groups, way groups may include ways of the system cache memory space in which a component cache may reside. For any component cache, no matter the set shift or the set offset, the target ways may indicate any combination of single or consecutive ways of the system cache. The way group partition of a component cache may allow for customization of the associativity of the component cache, both statically and dynamically, at run time. In the component cache configuration table 500, all combinations of the target way values may be correlated with any combination of set shift and set offset values. The combination of the set shift, set offset, and target ways in the component cache configuration table 500 define for the system cache controller all of the possible components caches. In an aspect, the target ways trait values may be represented by a bit vector, where each bit in the vector represents an individual way of the system cache. In the component cache configuration table 500, the bit vector is represented in hexadecimal. Returning to the example relating to row 522, the system cache represented in row 522 is the same as the system cache 420 in FIG. 4, having eight ways and two set groups. In this example, the target way trait field 510 contains a value of 0xF0, which may also be represented as a binary bit vector as 1111 0000. Thus, in this example, the component cache may reside in the four ways indicated by the "F" or by the "1" values, which correlate to the ways 402, 404, 406, and 410 of system cache 420 in FIG. 4. Various notations may be used to symbolize a value of the target ways in the target ways trait field 510.

The probe all ways trait field 512 in the component cache configuration table 500 may be used to indicate whether tags of all the ways of the system cache are looked up or probed for an access to the component cache. When the probe all ways trait indicates to probe all of the ways of the system cache, the probe of the component cache may not be limited by the target ways value. This may be the case in a dynamic component cache, which may be able to change sizes within its set group, i.e., change its target ways. Therefore, if the component cache grows or shrinks at different times, information stored in a way that is no longer part of the component cache may still be found in the same set group in the system cache. When a component cache is static, such that it does not vary the way group which the component cache occupies, the probe all ways trait field 512 may contain a null value or a value indicating that the probe all ways feature is not enabled for the correlated component cache. This may reduce power consumption by minimizing tag lookup and compare operations across all ways of the system cache.

The index mode trait field 514 in the component cache configuration table 500 may be used to indicate whether the correlated component cache may be indexed using a physical address in a physical indexing mode (PI), or a custom index in a custom indexing mode (CI). In an aspect, physical addressing may result in unpredictable and sometime excessive cache conflicts (depending on the memory allocation), thus the custom indexing mode may be used for accessing the component caches. Any form of custom index may be used. In an aspect, the custom index may include a virtual address index to ensure predictable conflict misses, such as according to a high level operating system memory allocation scheme. Another aspect may use a hash of the custom index with the virtual address most significant bits to minimize conflict misses. In the physical indexing mode the system cache controller may receive a physical address of the system cache as part of the system cache access request from the client, and use the received physical address of the system cache to translate it to a physical address of the component cache in the system cache. In the custom indexing mode the system cache controller may receive a physical address of the system cache and a custom index as part of the system cache access request from the client, and use the received physical address of the system cache and the received custom index to translate them to a physical address of the component cache in the system cache. An aspect process for translating the received physical address of the system cache and/or the received custom index to a physical address of the component cache in the system cache is described further herein.

The replacement policy trait field 516 in the component cache configuration table 500 may be used to indicate a replacement policy for the information stored in the correlated component cache. Some such replacement policies may include known replacement polices including most recently used, least recently used, first-in-first-out, last-in-first-out, and random replacement polices. Other known and proprietary replacement policies may be used for the information stored in the various component caches. A replacement policy may be customized for each component cache according to the replacement policy trait field 516.

The cache line size trait field 528 in the component cache configuration table 500 may be used to indicate a default or customized size of the cache lines for the correlated component cache. The default cache line size may be the standard cache line size of the system cache memory. In an aspect, the cache line size trait field 528 may be set to the default cache line size for some or all of the component caches when the corresponding component cache is created in the component cache configuration table 500. In an aspect, a null value may also indicate the default cache line size. In an aspect, the cache line size trait field 528 may be set to a custom cache line size that may be set from memory when a component cache is created in the component cache configuration table 500, or in association with a system cache access request. The custom cache line size may include the default cache line size when an indicated custom cache line size is the same as the default cache line size. In the example illustrated in FIG. 5, the component caches represented in rows 518-526 may include different values in the cache line size trait field 528. As illustrated, the values may be represented by a size value measured in units of digital information, such as bits, bytes, megabytes, and other variations. The values may also be represented in terms of the number of sets and or ways of the system cache memory the cache lines may span.

In an aspect, the cache line size may also be determined using the set shift trait field 506 and/or the target ways trait field 510. As described above, the set shift trait field 506 may indicate the number of sets of the system cache memory used in a component cache, and the target ways trait field 510 may indicate the ways of the system cache memory. The size of a cache line in a component cache may be dependent on the number of cache sets and/or ways making up the component cache. Thus, customizing the cache line size for a corresponding component cache may be achieved by setting the set shift trait field 506 and/or the target ways trait field 510.

In an aspect, the component cache configuration table 500 may be static, in that every possible component cache may be represented in the component cache configuration table 500 for at least the component cache identifier field 502, the set shift trait field 506, the set offset trait field 508, and the target ways trait field 510. The other fields 502, 512, 514, and 516 do not necessarily define a component cache, but represent traits of the component caches that may be static or variable. Thus, in a static cache configuration table 500, a row may exist for each combination of set shift, set offset, and target ways correlated with a component cache identifier. In the static cache configuration table 500, the other fields 502, 512, 514, and 516 may still be variable and allow for changes to their values. In an aspect, the component cache configuration table 500 may be dynamic in that rows including various combinations of set shifts, set offsets, and target ways correlated with component cache identifiers may be added to and deleted from the component cache configuration table 500 during runtime. Similar to the static component cache configuration table 500, the other fields 502, 512, 514, and 516 do not necessarily define a component cache, and may be variable and allow for changes to their values.

Figure 6:
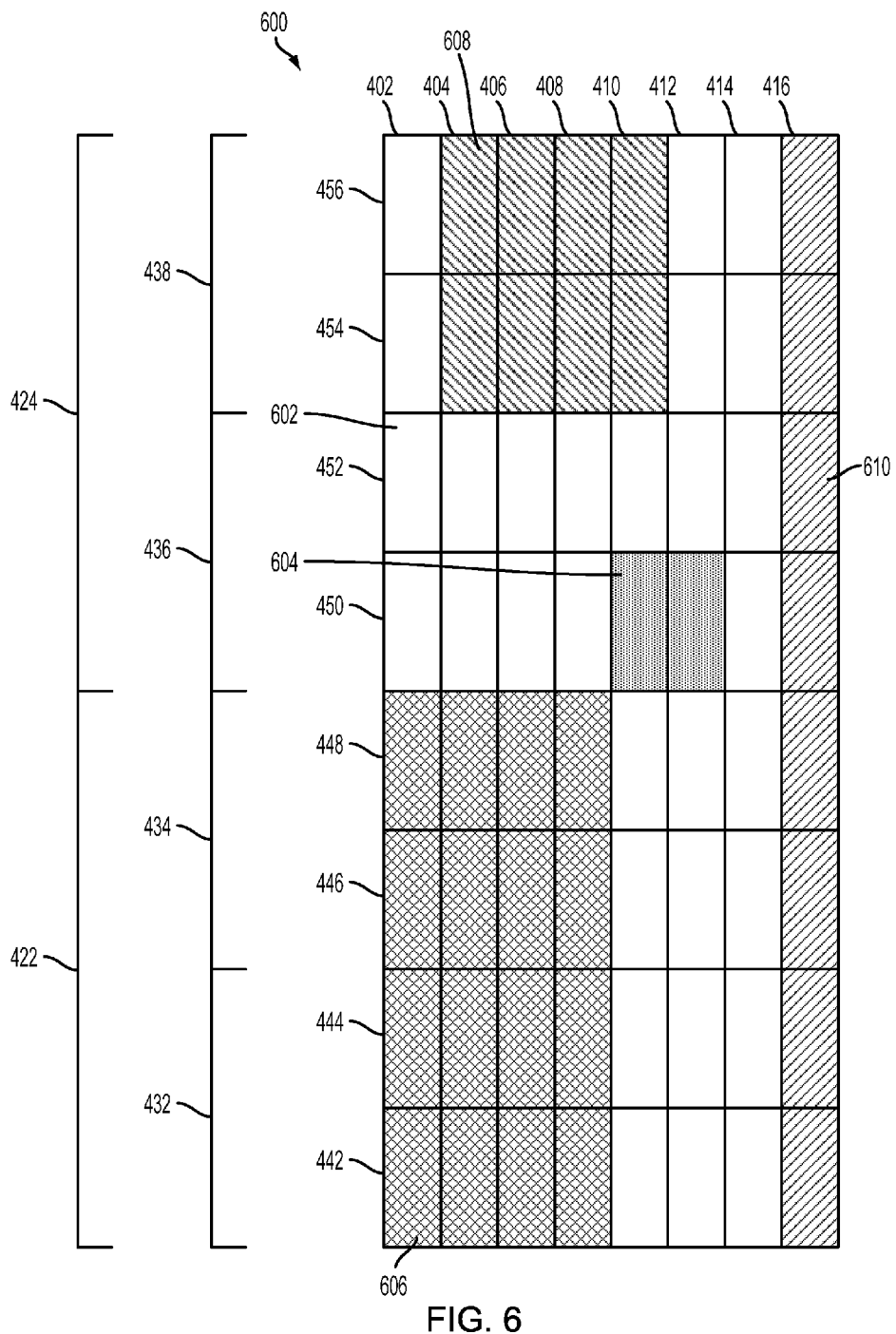
FIG. 6 is a schematic diagram illustrating an example system cache memory variably partitioned by sets and ways into component caches in accordance with an aspect.

FIG. 6 illustrates a system cache 600 variably partitioned by sets and ways into component caches. The component caches illustrated in FIG. 6 and described herein are only meant to be examples, and are in no way meant to be limiting. The component caches illustrated in FIG. 6 correlate with the non-limiting examples of the component caches illustrated in rows 518, 520, 522, 524, and 526 of FIG. 5. The component cache 602 correlates to the row 518 in the component cache configuration table 500. In this example, in row 518, the set shift value is null or zero. The set offset value is irrelevant because there are no set group partitions but may also be null or zero. The target ways include all of the ways 402-416 of the system cache 600 as indicated by the target ways=0xFF, which in a bit vector may be represented as 1111 1111, as described above.

In the example illustrated in FIG. 6, the component cache 604 correlates to the row 520 in the component cache configuration table 500. In this example, in row 520 the set shift=3 may represent that the system cache 600 is partitioned into eight set groups 442-456. The set offset=100 may represent that the component cache 604 is located in the set group 450. The target ways=0x0C, represented by the bit vector 0000 1100, may represent that the component cache 604 is located in the ways 410 and 412.

In the example illustrated in FIG. 6, the component cache 606 correlates to the row 522 in the component cache configuration table 500. In this example, in row 522 the set shift=1 may represent that the system cache 600 is partitioned into two set groups 422 and 424. The set offset=000 may represent that the component cache 604 is located in the set group 422. The target ways=0xF0, represented by the bit vector 1111 0000, may represent that the component cache 604 is located in the ways 402, 404, 406, and 408.

In the example illustrated in FIG. 6, the component cache 608 correlates to the row 524 in the component cache configuration table 500. In this example, in row 524 the set shift=2 may represent that the system cache 600 is partitioned into four set groups 432-438. The set offset=110 may represent that the component cache 604 is located in the set group 438. The target ways=0x78, represented by the bit vector 0111 1000, may represent that the component cache 604 is located in the ways 404, 406, 408, and 410.

In the example illustrated in FIG. 6, the component cache 610 correlates to the row 526 in the component cache configuration table 500. In this example, in row 526 the set shift value is null or zero. The set offset value is irrelevant because there are no set group partitions but may also be null or zero. The target ways include the way 416 of the system cache 600 as indicated by the target ways=0x01, which in a bit vector may be represented as 0000 0001.

FIG. 6 illustrates only a small sample of the potential component caches that may be managed by the system cache controller using the component cache configuration table

500. While the component caches 604, 606, 608, and 610 are illustrated in FIG. 6 as occupying non-overlapping locations in the system cache 600 (with the exception of component cache 602), it should be noted that this is only done for ease of explanation and that many of the component caches may overlap other component caches, as they overlap the component cache 602. Not all component caches may be active at the same time, thus use of overlapping of component caches may be managed by the system cache controller as discussed further herein. It should also be noted that the parameters of the different component caches may result in a different cache line size per component cache. As each component cache includes a partition of the entirety of the cache sets of the system cache, the cache line associated with each component cache may be less than all of the cache sets in a cache way. This may result in smaller cache lines than if not partitioned by cache sets, and the number of cache sets per component cache, defined by the set shift trait, may determine the cache line size per component cache.

Figure 7:
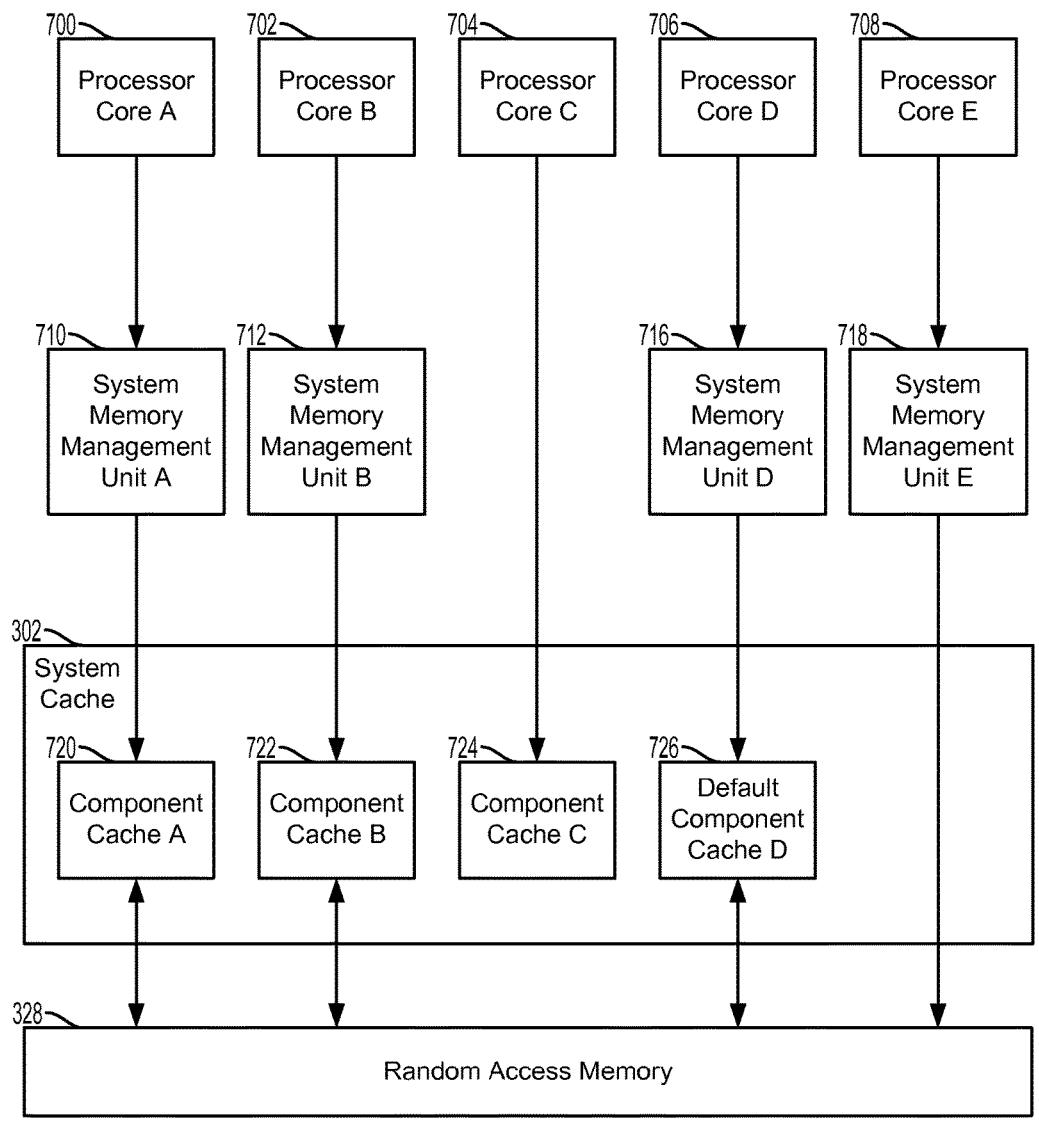
FIG. 7 is a schematic and process flow diagram illustrating examples of client access of component caches in accordance with an aspect.

FIG. 7 illustrates examples of client access of component caches. A client may include, for example, a program software, an operating system software, a computing device firmware, a processor, a processor core or a computing device subsystem, and system memory management unit, and may make system cache access requests to read from and write to a component cache of the system cache 302. A system cache access request made by one or more clients may vary in the request made to and in the response received from the system cache. The system cache access request from a client may include a processor core, such as processor core A 700, processor core B 702, processor core C 704, processor core D 706, and processor core E 708, sending a signal to request to read from or write to the system cache 302.

The processor 700-708 may include a virtual address or physical address, a component cache identifier, and component cache traits along with the system cache access request to read or write. In an aspect, the system memory management unit 710, 712, 714, 716 may be a separate component on the SoC between the processors, processor cores, or subsystems, and the system cache controller, or integrated into one or more of the same components. The system memory management unit 710, 712, 714, 716 may receive the system cache access request, virtual address, the component cache identifier, and the component cache traits. From the virtual address, the system memory management unit 710, 712, 714, 716 may determine a correlated physical address for the system cache memory space. In an aspect, the system memory management unit 710, 712, 714, 716 may compose a custom index from the virtual address. The system memory management unit 710, 712, 714, 716 may forward the system cache access request, the physical address for the system cache, the custom index, the component cache identifiers, and the component cache traits to the system cache 302. In an aspect, described further herein, the system cache controller may receive the information forwarded by the system memory management unit 710, 712, 714, 716 and translate the physical address of the system cache memory space to a physical address for the identified component cache.

The following examples describe various types of system cache memory access requests. One example may include a processor core A 700 making a system cache memory access request to a component cache A 720 specifying the use of the physical indexing mode. The processor core A 700 may send its system cache memory access request with a component cache identifier for the component cache A 720, a virtual address for the system cache memory space, and at least a physical indexing mode trait indicator. The system memory management unit A 710 may receive the information sent by processor core A 700, determine a physical address in the system cache memory space correlated with the virtual address, and forward the system cache memory access request the component cache identifier, the component cache traits, and the physical address for the system cache. In an aspect, the system memory management unit A 710 may or may not compose a custom index. Composing the custom index is not necessary in this instance because the physical indexing mode is specified, thus the custom index will not be used. However, in an aspect, the custom index may be composed and forwarded, and not used. In an aspect in which no indexing mode is specified, the custom indexing mode may be correlated with the component cache identifier in the component cache configuration table, which may be beneficial in instances in which no indexing mode is specified to provide a custom index regardless. The information forwarded by the system memory management unit A 710 may be used by the system cache 302 to access the component cache A 720. In an aspect, the component cache A 720 may reconcile changes in the data it stores with the RAM 328.

Another example may include a processor core B 702 making a system cache memory access request to a component cache B 722 specifying the use of the custom indexing mode. The processor core B 702 may send its system cache memory access request with a component cache identifier for the component cache B 722, a virtual address for the system cache memory space, and at least a custom indexing mode trait indicator. The system memory management unit B 712, may receive the information sent by the processor core B 702, determine a physical address in the system cache memory space correlated with the virtual address, compose a custom index, and forward the system cache memory access request, the component cache identifier, the component cache traits, the physical address for the system cache, and the custom index. The information forwarded by the system memory management unit B 712 may be used by the system cache 302 to access the component cache B 722. In an aspect, the component cache B 722 may reconcile changes in the data it stores with the RAM 328.

In an example, a processor core C 704 may make a system cache memory access request to a component cache C 724 using a physical address for the system cache. The processor core C 704 may send its system cache memory access request with a component cache identifier for the component cache C 724, a physical address for the system cache memory space, and any component cache traits directly to the system cache 302. The information sent by the processor core C 704 may be used by the system cache 302 to access the component cache C 724.

Another example may include a processor core D 706 making a system cache memory access request to a default component cache D 726, which may represent a component cache encompassing the entire system cache, such as component cache 602 of FIG. 6, rather than a component cache encompassing a partition of the system cache. The processor core D 706 may send its system cache memory access request with a virtual address for the system cache memory space. No component cache identifier or component cache traits need be sent by the processor core D 706 as the system cache memory access request is for the default component cache D 726. A default component cache identifier, such as a null or zero, may be sent and used to identify in the component cache configuration table that the system cache memory access request is for the default component cache. The system memory management unit D 716 may receive the information sent by processor core D 706, determine a physical address in the system cache memory space correlated with the virtual address and forward the system cache memory access request, the component cache identifier when provided, and the physical address for the system cache. The information forwarded by the system memory management unit D 716 may be used by the system cache 302 to access the default component cache D 726. In an aspect, the default component cache D 726 may reconcile changes in the data it stores with the RAM 328.

In an example, a processor core E 708 may make a non-cacheable system cache memory access request. In this example, the non-cacheable system cache memory access request may be directed to the RAM 328 through the system cache 302. The processor core E 708 may send its non-cacheable system cache memory access request with a virtual address for the system cache memory space. The system memory management unit E 718 may receive the information sent by processor core E 708, determine a physical address in the system cache memory space correlated with the virtual address, and forward the system cache memory access request and the physical address for the system cache. The information forwarded by the system memory management unit E 718 may be used by the system cache 302 to access the RAM 328 to execute the requested memory access function.

Figure 8:
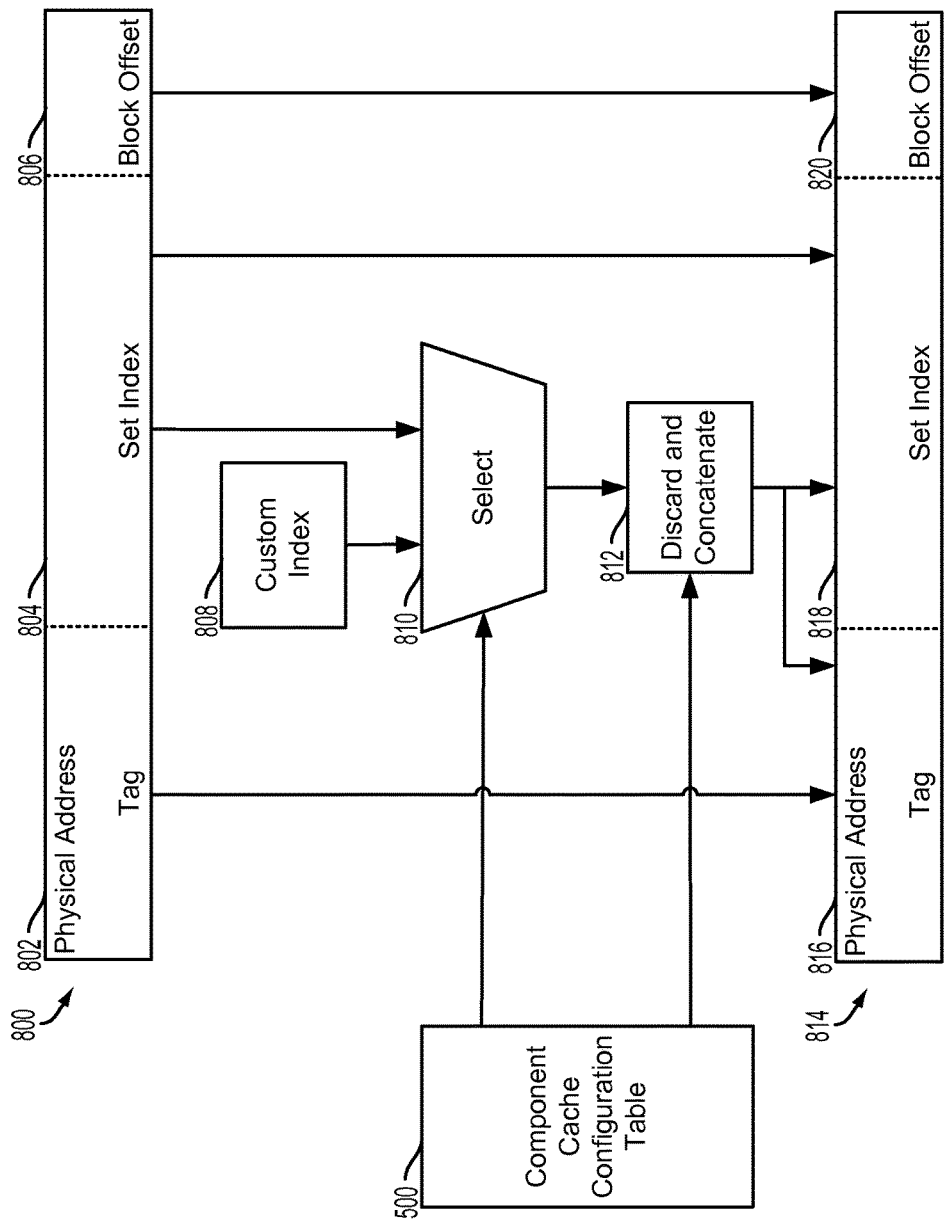
FIG. 8 is a schematic and process flow diagram illustrating an example of address translation for accessing component caches in accordance with an aspect.

FIG. 8 illustrates address translation for accessing component caches. The address translation by the system cache controller mentioned above translates the physical address in the system cache memory space 800 to the physical address of the component cache 814 in the system cache memory space. In an aspect, the physical address in the system cache memory space 800 may include a tag 802 and a physical index including a set index 804 and a block offset 806. The physical address of the component cache 814 may include an extended tag 816 and a modified physical index including a set index 818 and a block offset 820. As described above, the system cache controller may receive information of and relating to the system cache access request, including the physical address in the system cache memory space 800, the component cache identifier, and component cache traits, such as the indexing mode. The system cache controller may use this information to determine the physical address of the component cache 814. The system cache controller may use the component cache indexing mode trait, when supplied with the system cache access request, to update the indexing mode trait field in the component cache configuration table 500 for the corresponding component cache identifier also received with the system cache access request. The system cache controller may use the component cache identifier to determine from the component cache configuration table 500 the appropriate indexing mode, set shift and set offset to use for determining the physical address of the component cache 814 for the component cache identifier.

The system cache controller may use portions of the physical address in the system cache memory space 800 to determine portions of the determining the physical address of the component cache 814. For example, the system cache controller may use the block offset 806 from the physical address in the system cache memory space 800 to determine the block offset 820 of the physical address of the component cache 814. In aspect, the values in the block offset 806 and the block offset 820 may be the same. The system cache controller may use the tag 802 and the portions of the set index 804 of the physical address in the system cache memory space 800 and/or the custom index 808 to determine the tag 816 and the set index 818 of the physical address of the component cache 814, respectively.

In an aspect, the tag 802 and the set index 804 may be modified to determine the tag 816 and the set index 818. To modify the tag 802 and the set index 804 the system cache controller may use the indexing mode trait in the component cache configuration table 500 for the corresponding component cache identifier to select 810 whether to use a first set of bits of the set index 804, when the physical indexing mode is indicated, or replace the first set of bits of the set index 804 with the custom index 808, when the custom indexing mode is indicated. The indexing mode may determine a composition of a first set of bits of the set index 818 composed using either the first set of bits of the set index 804 or the custom index 808. Whichever of the first set of bits of the set index 804 or the custom index 808 are selected, the system cache controller may use a second set of bits of the set index 804 as a second set of bits of the set index 818 and combine them with either the first set of bits of the set index 804 or the custom index 808. Also, whichever of the first set of bits of the set index 804 or the custom index 808 are selected, the system cache controller may use the set shift and the set offset of the corresponding component cache identifier to determine an implementations of a discard (or shift) and concatenate operation 812. The set shift may define a number of most significant bits from the first set of bits of the set index 804 or the custom index 808 to discard and add (or shift) to the tag 816, thereby appending the discarded (or shifted) bits to tag 802 to determine tag 816, and expanding the size of the tag 816 from the size of tag 802 by the same number of bits. The set offset may be used to replace the discarded (or shifted) bits in the set index 818.

Figure 9:
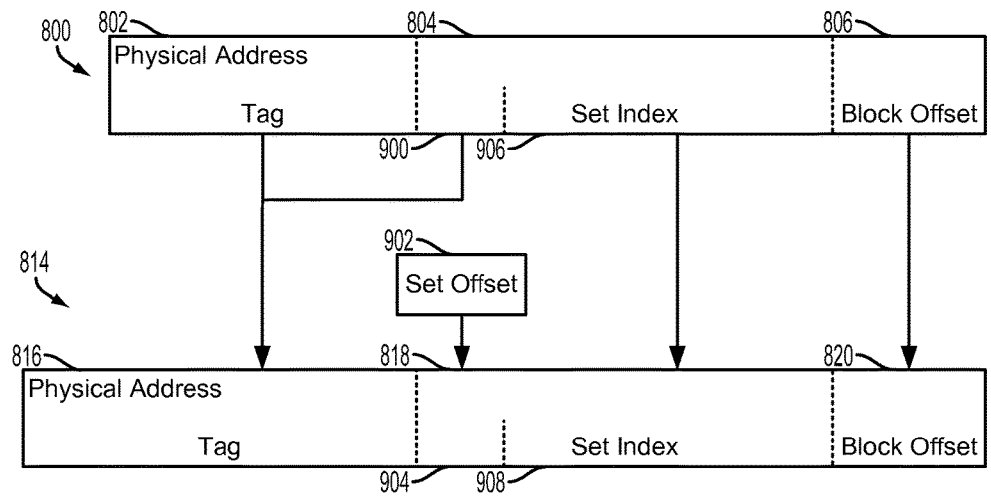
FIG. 9 is a schematic and process flow diagram illustrating an example of address translation using a physical address for accessing component caches in accordance with an aspect.

FIG. 9 illustrates address translation using a physical address for accessing component caches. As described above with reference to FIG. 8, the block offset 806 may be transposed to the block offset 820. When the indexing mode indicates physical indexing, the set index 804 may be modified to discard (or shift out) the first set of bits of set index 804, in an aspect the most significant bits 900. The number of the first set of bits of set index 804 may depend on the value of the set shift for the component cache. The second set of bits of set index 804, which in an aspect is the remaining bits 906 of the set index 804, may be used as the second set of bits of set index 818. In an aspect the remaining bits 906 may be transposed to the same bits 908 of the set index 818. The bits of the set offset 902 for the component cache may replace the discarded (or shifted out) first set of bits of set index 804, e.g. the most significant bits 900 of the set index 804, as the first set of bits of set index 818, in an aspect the most significant bits 904 of the set index 818. The tag 802 combined (e.g., appended) with the discarded (or shifted out) first set of bits of set index 804, e.g., the most significant bits 900 of the set index 804, may be transposed to the tag 816.

Figure 10:
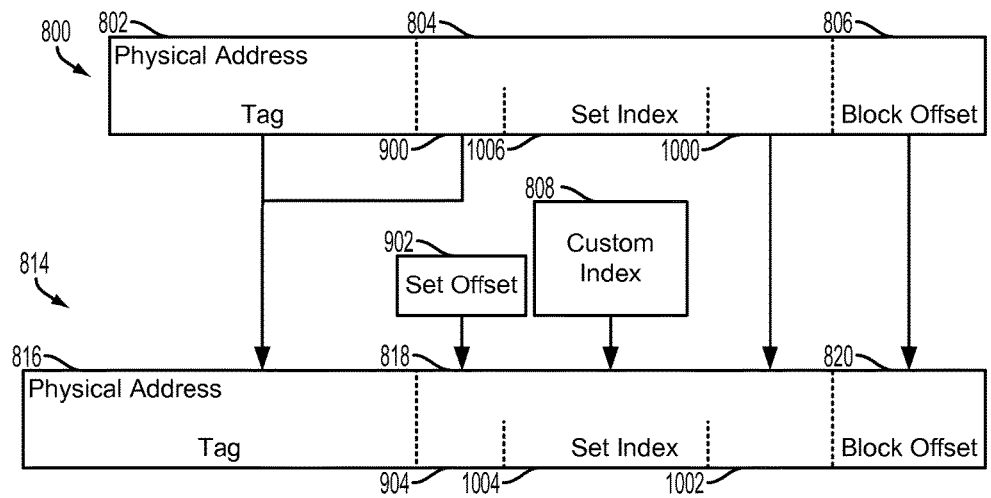
FIG. 10 is a schematic and process flow diagram illustrating an example of address translation using a physical address combined with a custom index for accessing component caches in accordance with an aspect.

FIG. 10 illustrates address translation using a custom index for accessing component caches. As described above with reference to FIG. 8, the block offset 806 may be transposed to the block offset 820. When the indexing mode indicates custom indexing, the set index 804 may be modified to discard (or shift out) the first set of bits of the set index 804, in an aspect the most significant bits 900. The number of the first set of bits of set index 804 may depend on the value of the set shift for the component cache. The remaining second set of bits of set index 804, which in an aspect is the middle bits 1006 and lower bits 1000 of the set index 804, may be used as the second set of bits of set index 818. In an aspect the lower bits 1000 may be transposed to the same bits 1002 of set index 818. The custom index 808 may replace the middle bits 1006 in the corresponding middle bits 1004 of the set index 818. The bits of the set offset 902 for the component cache may replace the first set of bits of the set index 804, e.g., the most significant bits 900 of the set index 804, as the first set of bits of set index 818, which in an aspect is the most significant bits 904 of the set index 818. The tag 802 combined (or appended) with the discarded (or shifted out) first set of bits of set index 804, e.g., the most significant bits 900 of the set index 804, may be transposed to the tag 816.

It should be noted that the above examples of discarding, shifting, transposing, combining, and appending bits of the physical address 800, the set offset 902, and the custom index 808 are merely examples and are in no way meant to be limiting. It is possible to manipulate and combine the bits of these components in any number of ways to arrange the bits of the physical address 814. For example, the bits of the set offset 902 may replace the most significant bits, the least significant bits, or middle bits of the set index 804.

In an aspect, the component caches may be activated and deactivated. Since there is a possibility of component caches overlapping in the system cache memory space, to avoid cache collisions, component caches overlapping active component caches may be deactivated. Also, to save power, component caches that are not in use may be deactivated. The component caches may be activated and deactivated at runtime, in part to dynamically partition the system cache memory space and assigned component caches to specified clients. Some of the clients of the system cache may only require the component caches for relatively short periods of time, and the system cache memory space being used by the component cache may be reserved for the client to avoid cache conflicts with other clients using the system cache. Further, when a client is finished with a component cache, the component cache may be deactivated and the system cache space unreserved, making the system cache memory space and the component cache available to other clients.

FIG. 11 illustrates an example component cache activate/deactivate control command 1100, which may include a register for storing relevant information to component cache activation and memory access operation. In an aspect, a component cache activate/deactivate control command 1100 may contain information, such as a trigger 1102, an operation code 1104, a component cache identifier 1106, an apply target ways 1108, and a target ways 1110. The trigger 1102 may be a flag, such as a one bit code, for indicating whether to start the system cache memory access for the component cache. For example, a bit value of "0" may indicate that the system cache memory access should not start, and a bit value of "1" may indicate that the system cache memory access may start. The operation code 1104 may be a code for indicating whether to activate or deactivate the component cache. For example, a two bit code where "01" signifies activate and "10" signifies deactivate may be used for the operation code 1104. The component cache identifier 1106 may store the value associated with a particular component cache related to the other information of the component cache activate/deactivate control command 1100. The apply target ways 1108 may be a flag that signifies whether to use the information stored in target ways 1110 in a system cache memory access. For example, a bit value of "0" may indicate to not use the information stored in target ways 1110, and a bit value of "1" may indicate to use the information stored in target ways 1110. The target ways 1110 may store the ways to activate within the component cache in the system cache memory space, and may be valid only when the operation code 1104 signifies activate. In an aspect, a client may not need to use the entire component cache for a system cache memory access, and may specify only activate certain ways within the component cache. When the client requires use of more ways in the component cache, more of the ways of the component cache may be specified by the target ways 1110.

FIG. 12 illustrates a component cache activate/deactivate control status 1200, which may include a register for storing relevant information to component cache memory access operation. In an aspect, the component cache activate/deactivate control status 1200 may contain information such as a done indicator 1202, which may be a flag. For example, a bit value of "0" may indicate that a system cache memory access operation has not yet started or is ongoing, and a bit value of "1" may indicate that a system cache memory access operation is complete.

The component cache activate/deactivate control command 1100 and the component cache activate/deactivate control status 1200 may be read by the system cache controller to manage the system cache memory space. In addition, FIG. 13 illustrates a component cache active ways table 1300 that may be used by the system cache controller to manage the use of the ways within the component cache. As described above, a client may or may not need to use the entire component cache for a system cache memory access, and may specify to only activate certain ways within the component cache. The system cache controller may track the active ways of each of the component caches by updating the component cache active ways table 1300. In the component cache active ways table 1300, a component cache identifier field 1302, like the one in the component cache configuration table, may be correlated with a corresponding active ways field 1034. The system cache controller may store the target ways requested by the client in the active ways field 1034, as read out from the target ways of the component cache activate/deactivate control command, when the apply target ways indicates to apply the target ways. When the apply target ways indicates not to apply the target ways, the active ways field 1034 may be set to a default value, a null value, or a value indicating all of the target ways of the component cache as specified in the component cache configuration table.

Figure 14:
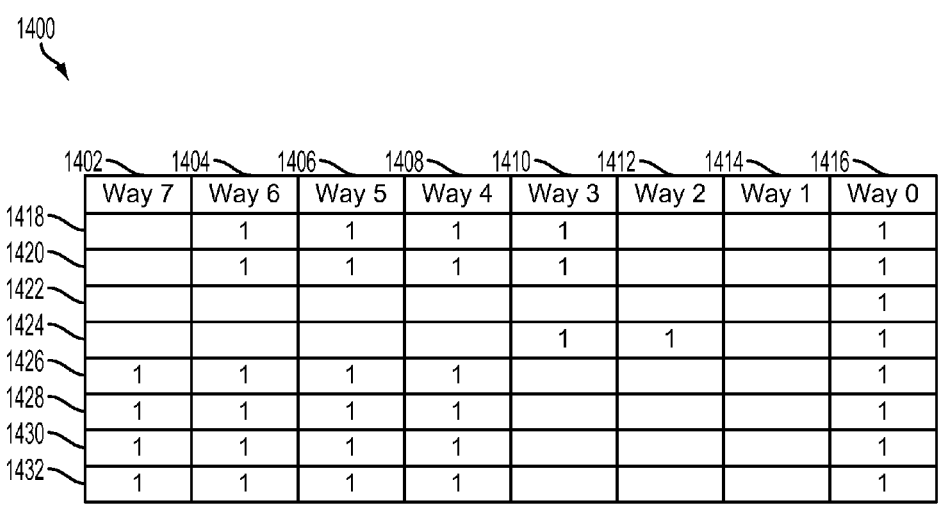
FIG. 14 is a schematic diagram illustrating an example component cache reservation table in accordance with an aspect.

FIG. 14 illustrates an aspect of a component cache reservation table 1400 that may be a companion table to the component cache active ways table described above. The component cache reservation table 1400 may include way columns 1402, 1404, 1406, 1408, 1410, 1412, 1414, 1416, and set group rows 1418, 1420, 1422, 1424, 1426, 1428, 1430, 1432, which may represent the ways and set groups of the component cache partitioned system cache. The component cache reservation table 1400 may set reserved and/or unreserved indicators for each pairing of a way and a set group in the system cache that is reserved by a client and/or unreserved. A component cache reservation table 1400 according to an aspect may allow the system cache controller to keep track of the locations in the system cache that are being used by clients, and avoid cache collisions by not allowing a client to use a system cache location that is being used by or is reserved for another client. In an aspect, the reserved indicators may match the set groups correlated with the component cache identifier of the system cache active ways table and the component cache configuration table, and match the ways indicated in the system cache active ways table. Once a client is done with the component cache space it has reserved, the reserved indicators may be removed from, or changed to unreserved indicators for, the corresponding locations in the component cache reservation table 1400.

In an example, the component cache active ways table 1300 illustrated in FIG. 13 shows active ways for four component cache identifiers. The system cache controller may reserve the system cache locations for each of the component cache identifiers limiting the reserved ways to the indicated active ways. The system cache locations may be determined from the set shift, set offset of the component cache configuration table, and the active ways in the component cache active ways table 1300. The system cache controller may reserve the locations in the system cache by marking the system cache locations reserved in the component cache reservation table 1400. Thus, in the example illustrated in FIG. 14, the component cache reservation table 1400 includes data indicating that the designated set groups and active ways are reserved for each of the system cache locations specified by the component cache identifiers and the corresponding component cache traits in the component cache configuration table and the component cache active ways table 1300.

It should be noted that it is possible, though unlikely, for component cache identifier "0" from the component cache configuration table 500 representing a component cache for the entire system cache to be included in the component cache activation table 1300 and the component cache reservation table 1400, because that would reserve the entire system cache unless the active ways for this component cache were limited. This would result in no other client being able to use the system cache until at least some of the ways were deactivated.

In an aspect the component caches may be resized using two W-bit vectors, where W is the number of cache ways and each bit in the vectors represents a particular cache way. Each component cache may be associated with one or both of the W-bit vectors. A reserved vector, or a first vector, may indicate the cache ways reserved for allocation to the associated component cache when activated. A bonus vector, or a second vector, may indicate extra cache ways that may be allocated to the associated component cache when free, or not reserved by any component cache. As discussed above, the component caches may be associated with particular clients, such as processing components or subsystems of the computing device.

Figure 15:
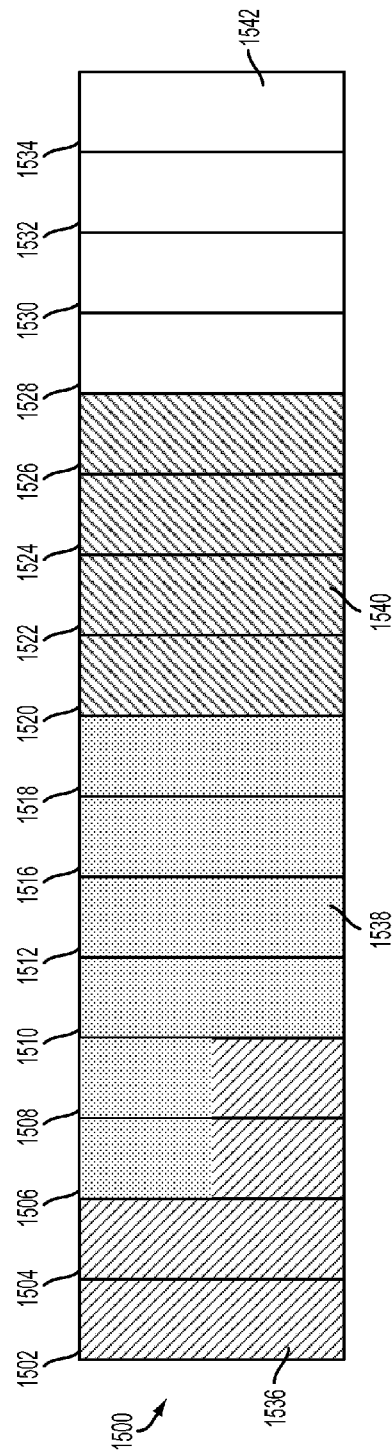
FIG. 15 is a schematic diagram illustrating an example system cache memory having reserved cache ways allocated to various component caches in accordance with an aspect.

FIG. 15 illustrates an example system cache memory having reserved cache way allocated to various component caches. The system cache memory 1500 may include a number of ways; in this example the system cache memory 1500 includes 16 ways 1502, 1504, 1506, 1508, 1510, 1512, 1514, 1518, 1520, 1522, 1524, 1526, 1528, 1530, 1532, and 1534. For this example, the two W-bit vectors may be 16 bit vectors. Reserved cache ways 1536 may be allocated to a first component cache of a first client, such as the CPU, and may include cache ways 1502-1508. The reserved cache ways 1536 may be represented by a first reserved vector=0xF000 in hexadecimal notation. In binary form the reserved cache ways 1536 may be represented by the first reserved vector=1111 0000 0000 0000. Comparing the binary form of the first reserved cache vector to the cache ways 1502-1534, the "1" bits correspond to the reserved cache ways 1536, including cache ways 1502-1508. Similarly, reserved cache ways 1538 may be allocated to a second component cache of a second client, such as one of the other processing components or subsystems of the computing device, and may include cache ways 1506-1518. The reserved cache ways 1536 may be represented by a second reserved vector=0x3F00 in hexadecimal notation. Reserved cache ways 1540 may be allocated to a third component cache of a third client, such as one of the other processing components or subsystems of the computing device, and may include cache ways 1520-1526. The reserved cache ways 1540 may be represented by a third reserved vector=0x00F0 in hexadecimal notation. Unreserved cache ways 1542 may include cache ways 1528-1534. Additionally, the first component cache may be associated with a first bonus vector=0x0FFF in hexadecimal notation, representing the potential to expand the first component cache into cache ways 1510-1534. As demonstrated with reserved cache ways 1536, 1538, reserved cache ways may overlap between component caches. This is possible because the component caches may occupy different set groups in the same ways of a system cache. Thus, multiple component caches may be activated within the same cache ways. In an aspect, the component cache 602 in FIG. 6 with component cache identifier "0" as illustrated in row 518 in FIG. 5 may have an associated reserved vector which may overlap with the reserved vector of other component caches.

For the first component cache to expand into the cache ways 1510-1534 indicated by the first bonus cache vector, each cache way 1510-1534 that the component cache expands into should be unreserved. The reserved vectors may be specified in an activate command for each component cache. The computing device may reserve and allocate one or more of the cache ways 1502-1534 for the appropriate component cache according to the reserved vector of the activate command. The reserved cache ways may be stored in a memory device, such as a register. The computing device may also store the bonus vectors for each component cache in a memory device, such as a register. The bonus vectors may be written to the memory device at boot time and/or a resource manager may assign the bonus vectors to each component cache based on use cases. The memory device storing the allocated cache ways for a particular component cache may be augmented to include the cache ways of the bonus vector in response to these cache ways being allocated to the component cache. The computing device, which in an aspect may be the system cache controller, may compute the available ways to allocate to a component cache, for the component cache's reserved vector and/or bonus vector. This computation may be accomplished using the following equation:

$$\text{ReservedVec}_X | (\text{BonusVec}_X \& \sim (\Sigma_{I=0}^{I=N-1} (\text{Active}_I ? \text{ReservedVec}_I : 0))$$

In the above equation X may be the component cache identifier for the relevant component cache, N may be the total number of component caches, and I may be the component cache identifier of all of the component caches. $\text{ReservedVec}_X$, $\text{ReservedVec}_I$, and $\text{BonusVec}_X$ may be the reserved vectors and the bonus vector for the component cache indicated by X and I, respectively. $\text{Active}_I$ may be asserted when the component cache of I is active. The summation may be a bitwise OR operator applied for each component cache. In response to calculating an available cache way included in the bonus vector of a component cache, the component cache may be allocated the available cache way.

Figure 16:
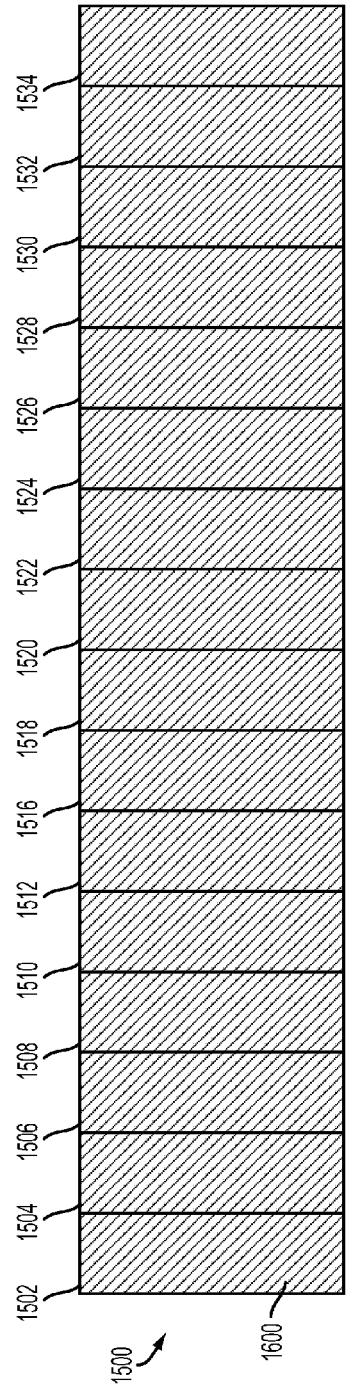
FIG. 16 is a schematic diagram illustrating an example system cache memory having reserved and bonus cache ways allocated to a component cache in accordance with an aspect.

FIG. 16 illustrates an example system cache memory having reserved and bonus cache ways allocated to a component cache in accordance with an aspect. Continuing with the example in FIG. 15, the first component cache may use cache ways 1502-1510 and 1528-1534 in the system cache 1500. As noted above, cache ways 1502-1510 may fall in the range of the reserved vector of the first component cache; however, cache ways 1528-1534 fall in the range of the bonus vector of the first component cache. The cache ways 1528-1534 may not be reserved by another component cache for the computing device to allocate the cache ways 1528-1534 to the first component cache. While cache ways 1528-1534 are not reserved in this example, the bonus cache vector for the first component cache does overlap with reserved cache ways 1538 and 1540, including cache ways 1510-1526, as shown in FIG. 15. To allocate the cache ways 1528-1534 to the first component cache, the computing device may allocate all of the cache ways 1510-1534 indicated in the bonus vector for the first component cache. The computing device may deactivate the second and third component caches to unreserve cache ways 1510-1526 and allocate the cache ways 1510-1534 to the first component cache in addition to the reserved cache ways 1538 in FIG. 15. The first component cache may be allocated reserved cache ways 1600, including all of the cache ways 1502-1534.

FIG. 17 illustrates an example system cache memory having reserved cache ways allocated to various component caches in accordance with an aspect. The following example uses the same system cache 1500 of FIG. 15 only with different reserved cache ways 1700 and 1702, and unreserved cache ways 1704. Reserved cache ways 1700 may be allocated to the first component, and may include cache ways 1502-1508. The reserved cache ways 1700 may be represented by the first reserved vector=0xF000 in hexadecimal notation. The reserved cache ways 1702 may be allocated to the second component cache, and may include cache ways 1506-1518. The reserved cache ways 1536 may be represented by a second reserved vector=0x3F00 in hexadecimal notation. The unreserved cache ways 1704 may include cache ways 1520-1534. Additionally, the second component cache may be associated with the second bonus vector=0xC000 in hexadecimal notation, representing the potential to expand the second component cache into cache ways 1502 and 1504.

FIG. 18 illustrates an example system cache memory having reserved and bonus cache ways allocated to a component cache in accordance with an aspect. Continuing the example in FIG. 17, the second component cache may use cache ways 1506-1518 in the system cache 1500. As noted above, cache ways 1506-1518 may fall in the range of the reserved vector of the second component cache. The cache ways 1506-1518 may not be reserved by another component cache for the computing device to allocate the cache ways 1506-1518 to the second component cache. However, the cache ways 1506 and 1508 overlap with reserved cache ways 1700, including cache ways 1502-1508 as shown in FIG. 17. To allocate the cache ways 1506-1518 to the second component cache, the computing device may deactivate the first component cache to unreserve cache ways 1506 and 1508, and allocate the cache ways 1502-1518 to the second component cache. The second component cache may be allocated reserved cache ways 1800, including reserved cache ways 1702, and the extra cache ways 1502 and 1504 unreserved by the deactivation of the first component cache, which are included in the bonus cache vector of the second component cache.

Figure 19:
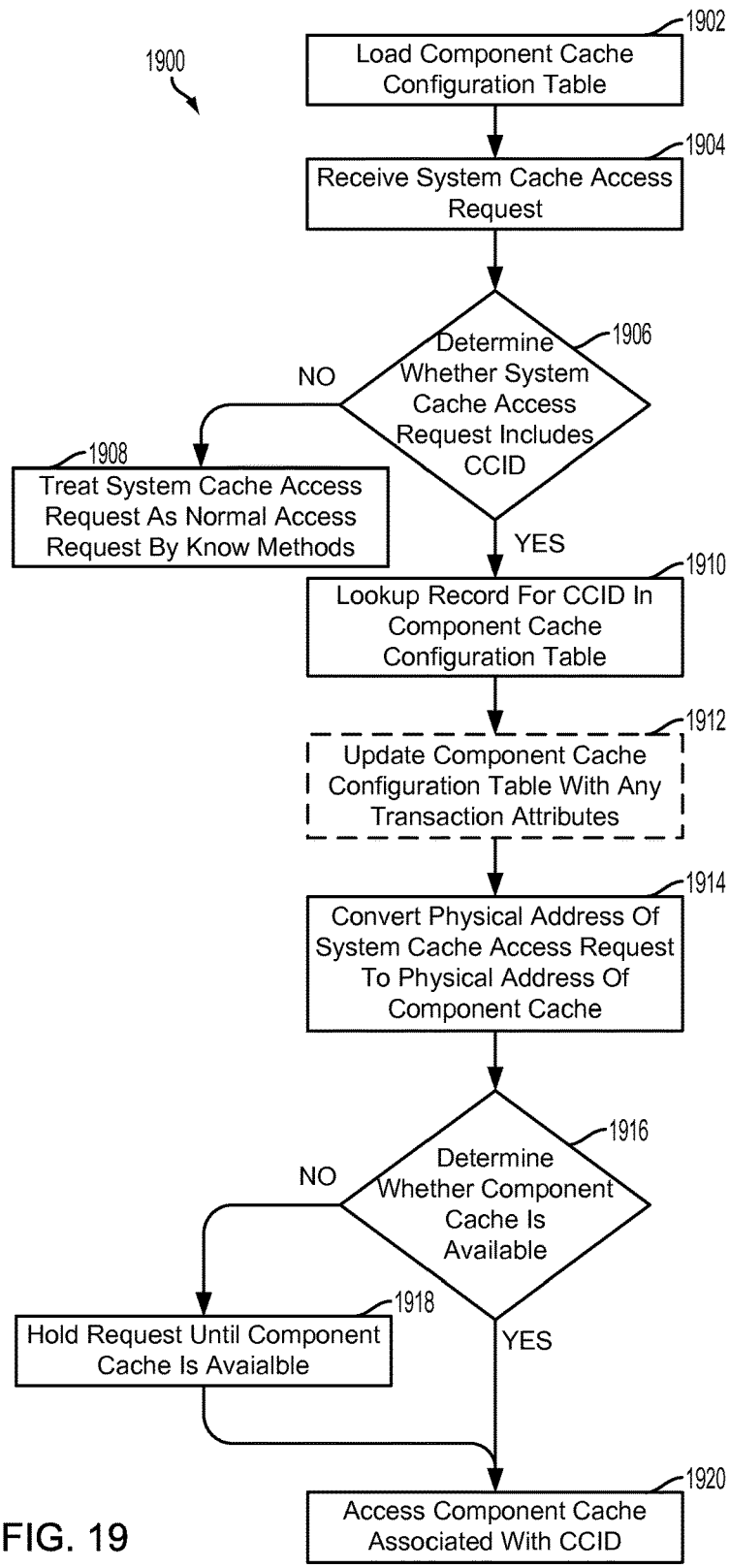
FIG. 19 is a process flow diagram illustrating an aspect method for accessing a component cache of a system cache memory partitioned by sets and ways into component caches.

FIG. 19 illustrates an aspect method 1900 for accessing a component cache of a system cache memory partitioned by sets and ways into component caches. The method 1900 may be executed by the computing device as described herein, such as by the system cache controller. In block 1902 the computing device may load the component cache configuration table. In an aspect with a static component cache configuration table, loading the component cache configuration table may occur during a boot time of the computing device, and the component cache configuration table may be populated with every combination of component cache that may be possible for a system cache. The component cache configuration table may be populated with at least the component cache identifiers, the set shift traits, the set offset traits, and the target ways traits. In an aspect with a dynamic component cache configuration table as described herein, the component cache table may be loaded at boot time or upon the first request for a component cache access. The dynamic component cache configuration table may be loaded from the last version of the component cache configuration table that may have been saved by the computing device, or may be an empty table to be populated based on the component cache access requests received.

In block 1904 the computing device may receive a system cache access request. As described above, the system cache access request may originate from a client on the computing device and be received by the system cache controller. The system cache access request may include a request to read from or write to the system cache, a component cache identifier, component cache traits, a physical address of the system cache, and a custom index. In determination block 1906 the computing device may determine whether the system cache access request includes a component cache identifier (CCID). In response to determining that the system cache access request does not include a component cache identifier (i.e. determination block 1906="No"), the computing device may treat the system cache access request as a normal access request by known methods in block 1908.

In response to determining that that the system cache access request does include a component cache identifier (i.e. determination block 1906="Yes"), the computing device may look up a record correlating to the component cache identifier in the component cache configuration table in block 1910. As described above, in an aspect in which the component cache configuration table is static, there is a record for every possible component cache having a component cache identifier for the system cache. In optional block 1912 the computing device may update the record corresponding to the component cache identifier in a component cache configuration table with any of the received component cache traits that may differ from the component cache traits already in the record. Alternatively, the computing device may replace all of the component cache traits in the record without determining whether they are different.

In block 1914 the computing device may convert the physical address received with the system cache access request to the corresponding physical address of the component cache in the system cache. As described in more detail herein, converting the address may involve determining whether the indexing mode trait of the component cache is physical indexing or custom indexing.

In determination block 1916 the computing device may determine whether the component cache is available. As described further herein, determining whether the component cache is available may involve determining whether the system cache locations of the component cache are reserved for another client of the computing device. In response to determining that that the component cache is not available (i.e. determination block 1916="No"), the computing device may hold the system cache access request until the component cache becomes available in block 1918. In block 1920 the computing device may access the component cache associated with the component cache identifier of the system cache access request to implement the read or write operation requested.

Figure 20:
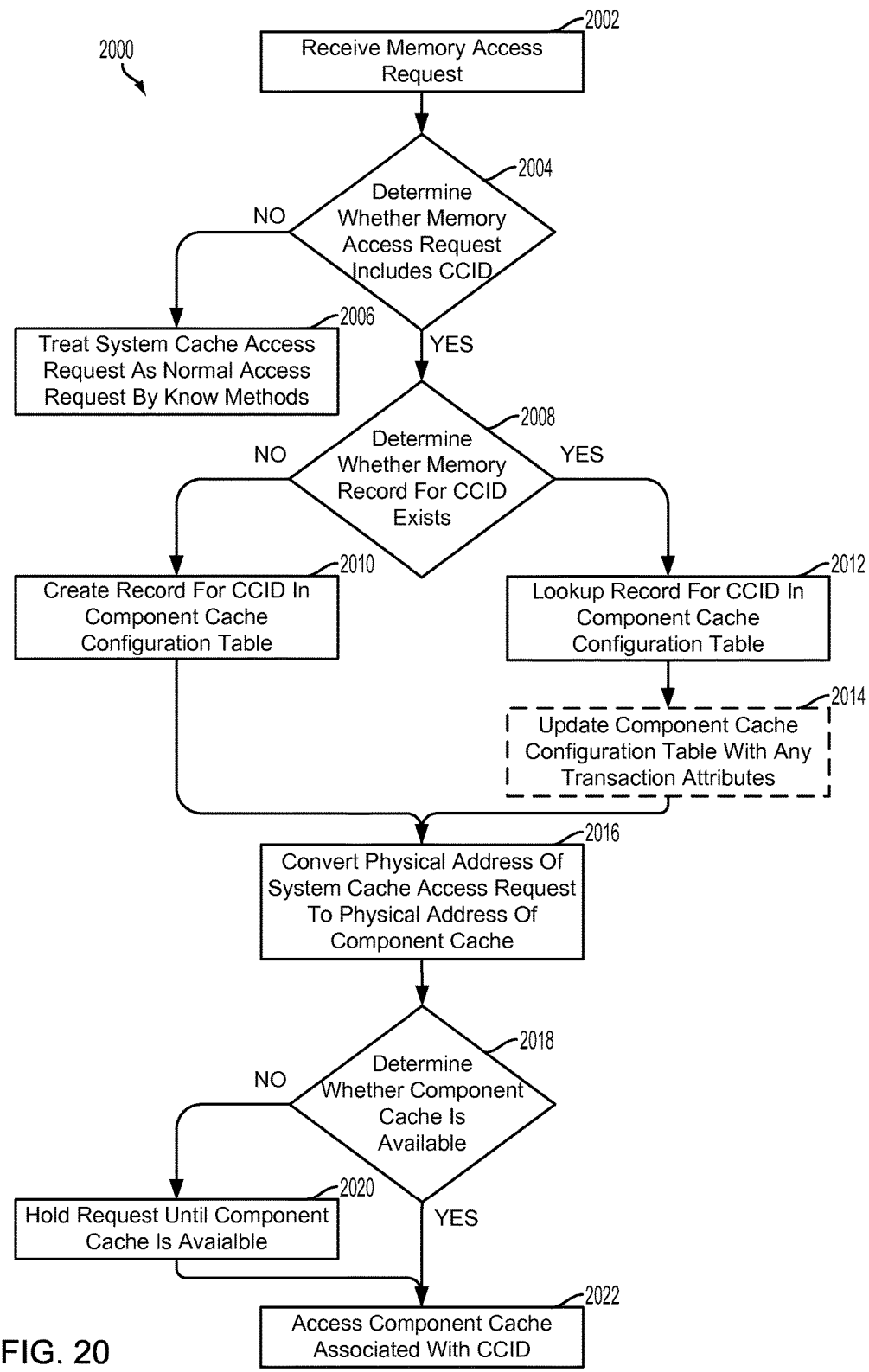
FIG. 20 is a process flow diagram illustrating an aspect method for accessing a component cache of a system cache memory partitioned by sets and ways into component caches.

FIG. 20 illustrates an aspect method 2000 for accessing a component cache of a system cache memory partitioned by sets and ways into component caches. The method 2000 may be executed by the computing device as described herein, such as by the system cache controller. In an aspect the method 2000 may be implemented for a loaded dynamic component cache configuration table as described herein. In block 2002 the computing device may receive a system cache access request. As described above, the system cache access request may originate from a client on the computing device and be received by the system cache controller. The system cache access request may include a request to read from or write to the system cache, a component cache identifier, component cache traits, a physical address of the system cache, and a custom index.

In determination block 2004 the computing device may determine whether the system cache access request includes a component cache identifier (CCID). In response to determining that that the system cache access request does not include a component cache identifier (i.e. determination block 2004="No"), the computing device may treat the system cache access request as a normal access request by known methods in block 2006.

In response to determining that that the system cache access request does include a component cache identifier (i.e. determination block 2004="Yes"), the computing device may determine whether a record for the component cache identifier exists in the component cache configuration table in determination block 2006. A record may or may not exist for the component cache identifier in the component cache configuration table, because in a dynamic component cache configuration table the record for the component cache identifier may not be part of the loaded component cache configuration table, or the record may be removed from the table when the component cache is deactivated, for example.

In response to determining that that the record for the component cache does not exist in the component cache configuration table (i.e. determination block 2006="No"), the computing device may create the record for the component cache in the component cache configuration table in block 2010. In an aspect, the system cache controller may use the information provided with the system cache access request, including the component cache identifiers and the component cache traits, to create the record for the component cache in the component cache configuration table.

In response to determining that that the record for the component cache does exist in the component cache configuration table (i.e. determination block 2006="Yes"), the computing device may look up a record correlating to the component cache identifier in the component cache configuration table in block 2012. In optional block 2014 the computing device may update the record corresponding to the component cache identifier in component cache configuration table with any of the received component cache traits that may differ from the component cache traits already in the record. Alternatively, the computing device may just replace all of the component cache traits in the record without determining whether they are different.

In block 2016 the computing device may convert the physical address received with the system cache access request to the corresponding physical address of the component cache in the system cache. As described in more detail herein, converting the address may involve determining whether the indexing mode trait of the component cache is physical indexing or custom indexing.

In determination block 2018 the computing device may determine whether the component cache is available. As described herein, determining whether the component cache is available may involve determining whether the system cache locations of the component cache are reserved for another client of the computing device. In response to determining that the component cache is not available (i.e. determination block 2018="No"), the computing device may hold the system cache access request until the component cache becomes available in block 2020. In block 2022 the computing device may access the component cache associated with the component cache identifier of the system cache access request to implement the read or write operation requested.

Figure 21:
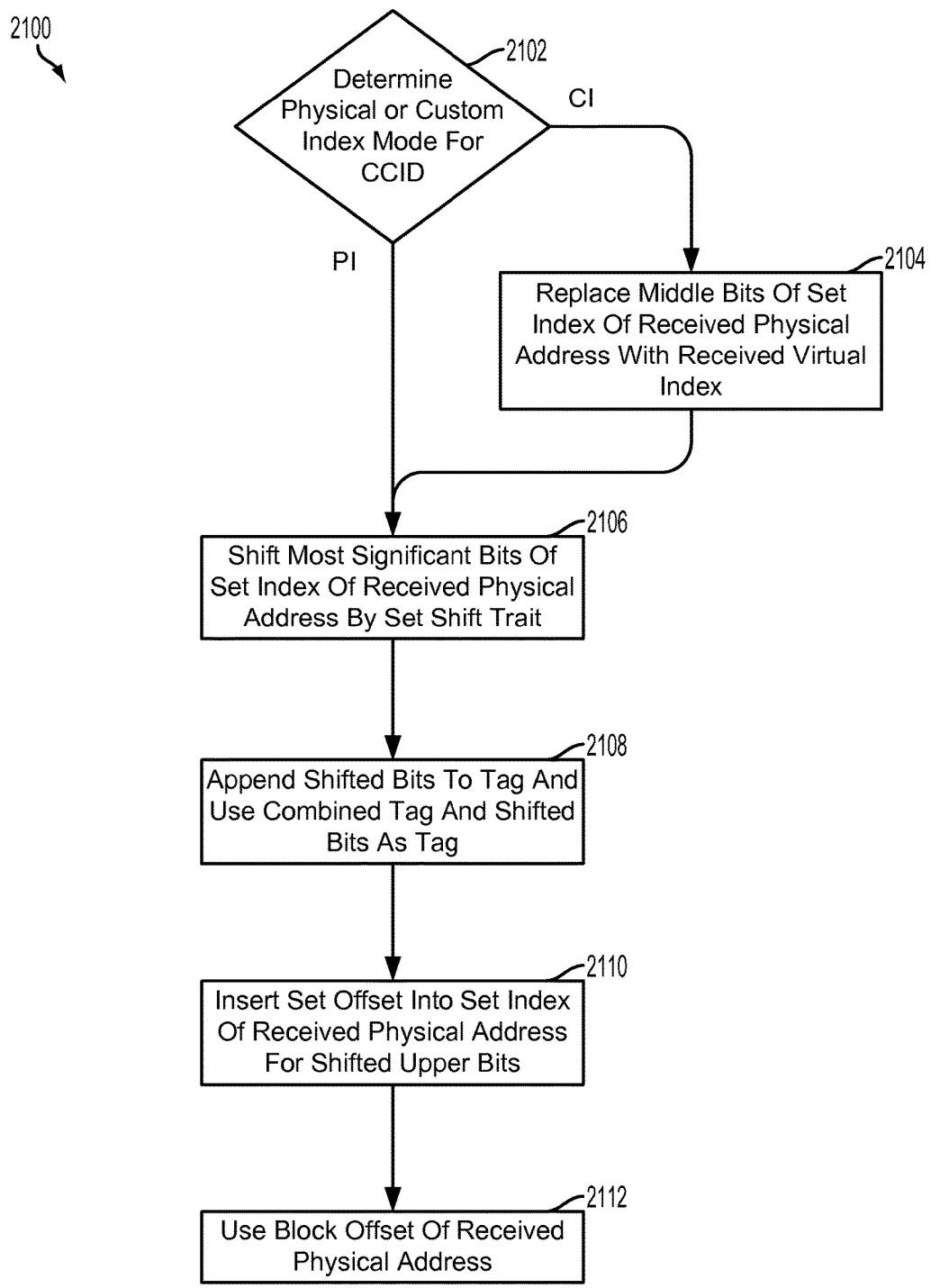
FIG. 21 is a process flow diagram illustrating an aspect method for translating cache memory addresses for accessing a component cache of a system cache memory partitioned by sets and ways into component caches.

FIG. 21 illustrates an aspect method 2100 for translating cache memory addresses for accessing a component cache of a system cache memory partitioned by sets and ways into component caches. The method 2100 may be implemented as part of block 1914 of method 1900 in FIG. 19, and as part of block 2016 of method 2000 in FIG. 20. The method 2100 may be executed by the computing device as described herein, such as by the system cache controller.

In determination block 2102 the computing device may determine whether the indexing mode trait for a correlated component cache identifier indicates physical indexing or custom indexing. The computing device may check the indexing mode trait field in the component cache configuration table for the record of the correlated component cache identifier to determine whether the indexing mode indicates physical indexing or custom indexing. In response to determining that the indexing mode trait for the correlated component cache identifier indicates custom indexing (i.e., determination block 2102="CI"), the computing device may replace the middle bits of the set index of the received physical address with the received custom index in block 2104. As noted above, the middle bits of the set index are the bits between the most significant bits that are shifted out of the set index and the lower bits of the set index that are transposed to the lower bits of the set index of physical address of the component cache.

In block 2106 the computing device may shift out a number of the most significant bits of the set index of the received physical address. The number of the most significant bits shifted out of the set index may be determined by a value of the set shift trait of the corresponding component cache identifier in the component cache configuration table. In block 2108 the computing device may append the shifted most significant bits of the set index to the tag of the received physical address, and use the tag combined with the shifted bits as the tag. In block 2110 the computing device may insert a value of a set offset trait of the corresponding component cache identifier in the component cache configuration table. In block 2112 the computing device may use the same block offset of the received physical address. Thus, the physical address of the component cache in the system cache is a function of the physical address received for the system cache access request, in which the set index is modified from the received set index by shifting most significant bits, replacing the shifted bits with a designated value, alternatively using the same middle bits or replacing them with a custom index, using the same lower bits, using the same tag with the shifted bits appended to it, and using the same block offset.

Figure 22:
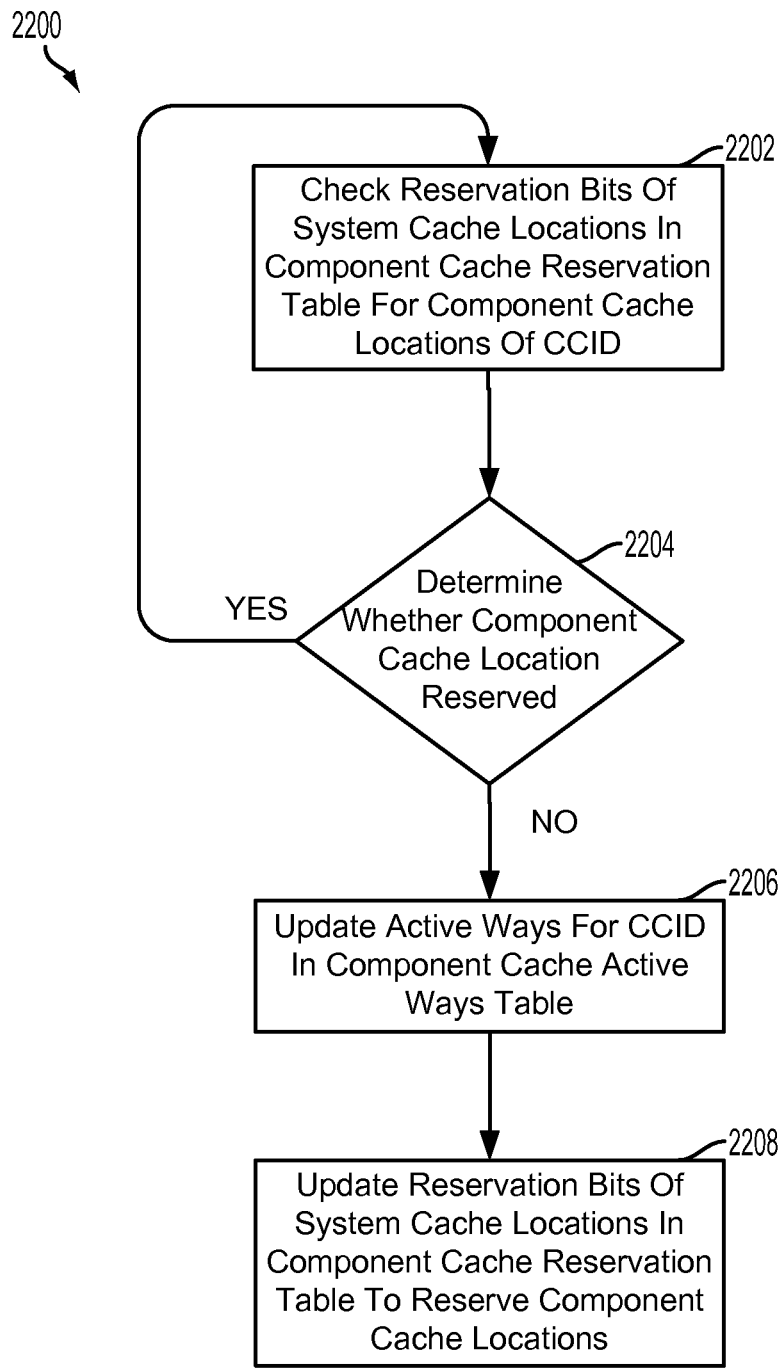
FIG. 22 is a process flow diagram illustrating an aspect method for dynamically activating a component cache of a system cache memory partitioned by sets and ways into component caches.

FIG. 22 illustrates an aspect method 2200 for dynamically activating a component cache of a system cache memory partitioned by sets and ways into component caches. The method 2200 may also be considered dynamic partitioning of the system cache using component caches as some or all of the system cache locations of an activated component cache may be reserved for a client, thereby preventing other clients from using the dynamically partitioned portion of the system cache. The method 2200 may be implemented as part of blocks 1916-1920 of method 1900 in FIG. 19, and as part of blocks 2018-2022 of method 2000 in FIG. 20. The method 2200 may be executed by the computing device as described herein, such as by the system cache controller.

In block 2202 the computing device may check the reservation indicators of the system cache locations in the component cache reservation table for the for the component cache locations related to the component cache identifier. As described herein, the component cache locations, and thereby the system cache locations, may be determined by the combination of set shift, set offset, and target ways for the component cache identifier in the component cache configuration table. In an aspect, the reserved component cache locations may also be regulated by the active ways for the component cache identifier in the component cache active ways table. The active ways may indicate the reserved locations while the target ways may indicate either the reserved locations or just the entirety of the tags that may be used and reserved by the component cache but are not necessarily used or reserved.

In determination block 2204 the computing device may determine whether the component cache locations are reserved. As discussed above, whether the component cache locations are reserved may depend on the active ways of the corresponding component cache in the active way component cache table. In response to determining that the component cache locations are reserved (i.e. determination block 2204="Yes"), the computing device may check whether the locations are reserved again in block 2202.

In response to determining that the component cache locations are not reserved (i.e. determination block 2204="No"), the computing device may update the active ways table for the component cache identifier in block 2206. Updating the active ways table for the component cache identifier indicates that the component cache of the system cache access request may reserve the system cache memory locations represented by the set shift, set offset, and active ways of the component cache identifier. In block 2208 the computing device may update the reservation indicators of the system cache locations in the component cache reservation table for the component cache. Once the system cache locations are reserved for the component cache in the component cache reservation table, these locations are effectively dynamically portioned from the rest of the system cache as these locations are reserved for the specific requesting client. Other clients requesting access to the reserved locations of the system cache may be denied access to the reserved locations until the reserved locations are deactivated for the client who reserved the location.

Figure 23:
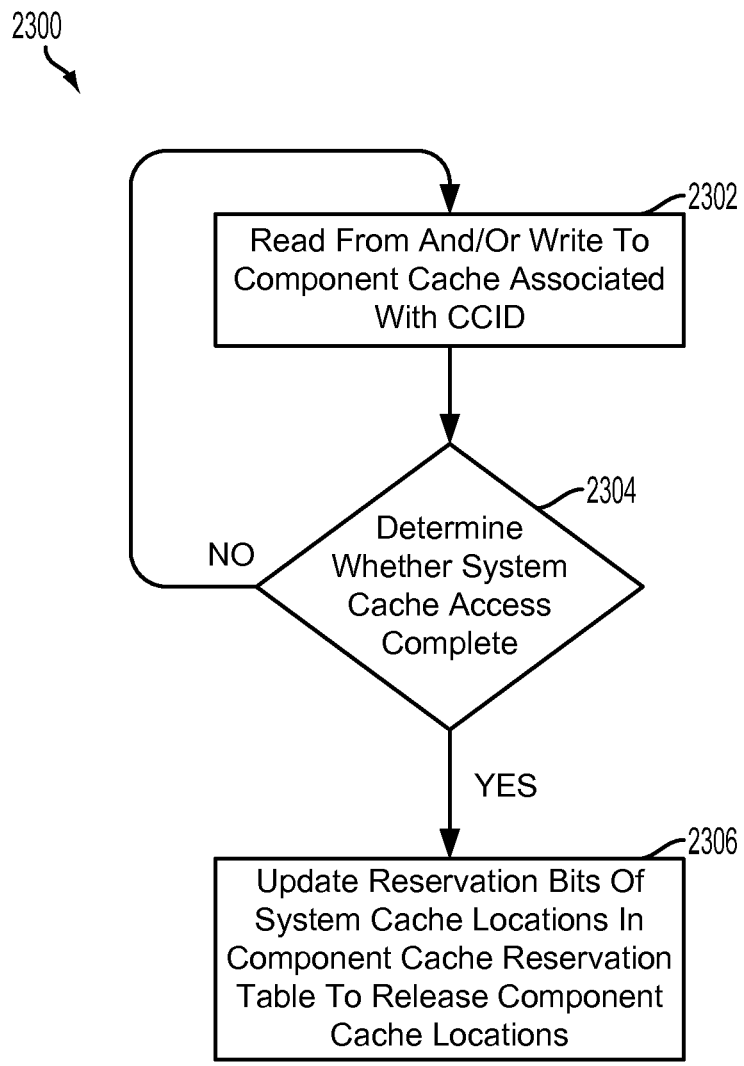
FIG. 23 is a process flow diagram illustrating an aspect method for dynamically deactivating a component cache of a system cache memory partitioned by sets and ways into component caches.

FIG. 23 illustrates an aspect method 2300 for dynamically deactivating a component cache of a system cache memory partitioned by sets and ways into component caches. The method 2300 may be implemented as part of block 1920 of method 1900 in FIG. 19, and as part of block 622 of method 2000 in FIG. 20. The method 2300 may be executed by the computing device as described herein, such as by the system cache controller. In block 2302 the computing device may read from and/or write to the reserved locations of the component cache associated with the component cache identifier of the system cache access request. In determination block 2304 the computing device may determine whether the system cache access is complete. In response to determining that the system cache access is not complete (i.e. determination block 2304="No"), the computing device may continue reading from and/or writing to the reserved locations of the component cache in block 2302. In response to determining that the system cache access is complete (i.e. determination block 2304="Yes"), the computing device mat update the reservation indicators of the system cache locations in the component cache reservation table to release/deactivate the locations reserved by the component cache in block 2306.

In an aspect, a client for whom system cache space is reserved may dynamically request additional or less component cache space, and thereby reserve system cache space. In the method 2200, the client requesting more space may do so for system cache locations of the component cache not already reserved. In the method 2300, the client requesting less space may do so by completing access of only part of the reserved system cache locations of the component cache.

Figure 24:
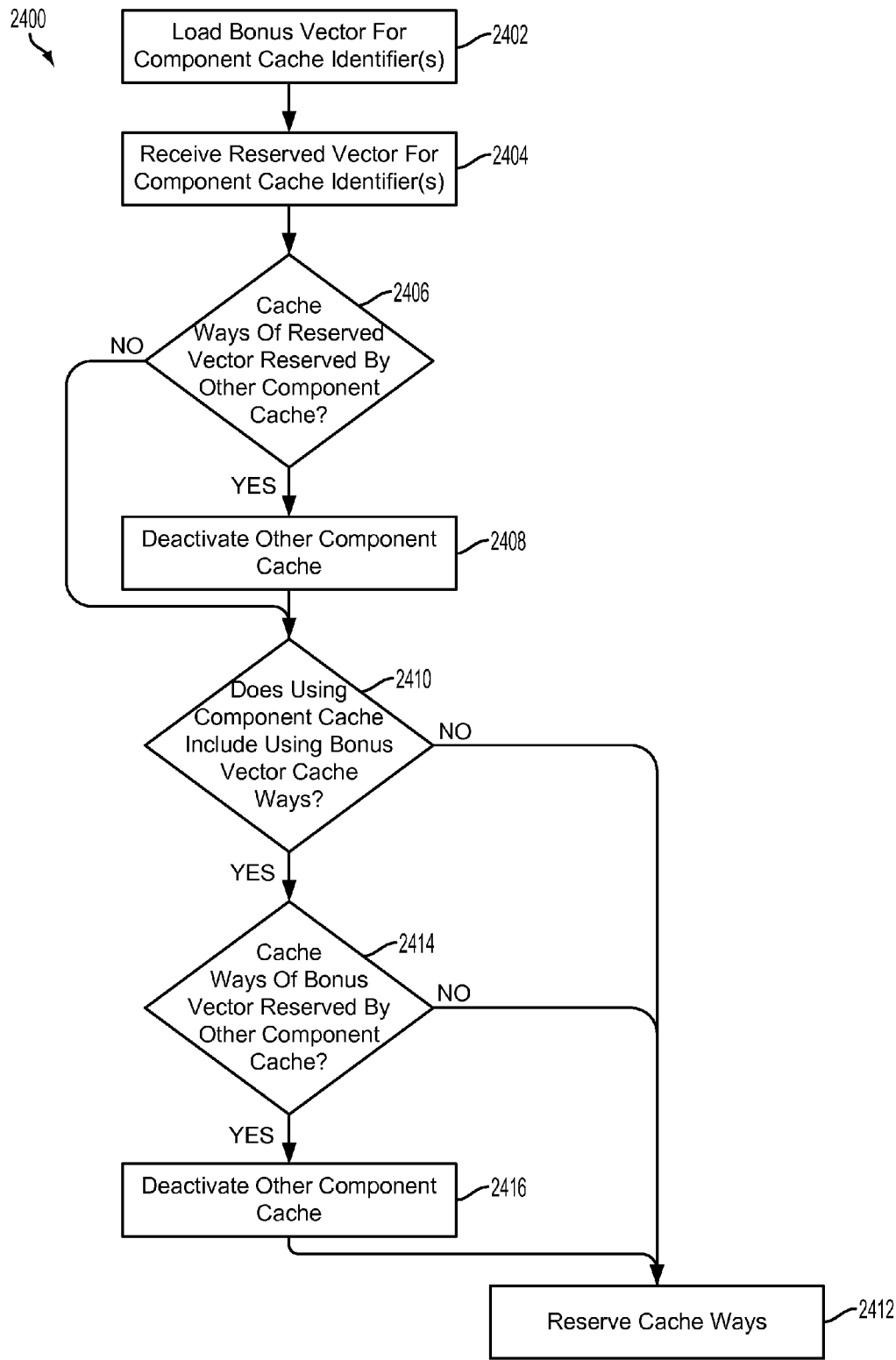
FIG. 24 is a process flow diagram illustrating an aspect method for dynamically resizing a component cache of a system cache memory partitioned by sets and ways into component caches.

FIG. 24 illustrates an aspect method 2400 for dynamically resizing a component cache of a system cache memory partitioned by sets and ways into component caches. The method 2400 may be implemented as part of blocks 1916-1920 of method 1900 in FIG. 19, and as part of blocks 2018-2022 of method 2000 in FIG. 20. The method 2200 may be executed by the computing device as described herein, such as by the system cache controller. In block 2402, the computing device may load a bonus vector for at least one component cache identifier. As discussed above, the bonus vector may indicate one or more cache ways for an associated component cache, associated with the component cache identifier related to the bonus vector, to expand into. Loading the bonus vector may be done at boot time and/or run time, and the bonus vector may be stored in a register. The computing device may load all or some of the bonus vectors. In block 2404, the computing device may receive a reserved vector for a least one component cache identifier. As discussed above, the reserved vector may indicate one or more cache ways to be reserved for an associated component cache, associated with the component cache identifier related to the reserved vector.

In determination block 2406, the computing device may determine whether one or more cache ways of the reserved vector are reserved by another component cache. To make this determination, the computing device may implement the equation discussed above. In response to determining that the cache ways of the reserved vector are reserved by another component cache (i.e., determination block 2406="Yes"), the computing device may deactivate the other component cache in block 2408. Deactivating the other component cache may result in unreserving the cache ways reserved by the other component cache, thereby unreserving the cache ways overlapping with the cache ways of the reserved vector. In response to determining that the cache ways of the reserved vector are unreserved (i.e., determination block 2406="No"), the computing device may determine whether using the component cache includes using one or more of the cache ways of the associated bonus vector in determination block 2410.

In response to determining that using the component cache does not include using one or more of the cache ways of the associated bonus vector (i.e., determination block 2410="No"), the computing device may reserve the unreserved cache ways for the associated component cache in block 2412. Reserving the cache ways may be accomplished by writing the reserved vector to a register containing the reserved cache ways data. In response to determining that using the component cache does include using one or more of the cache ways of the associated bonus vector (i.e., determination block 2410="Yes"), the computing device may determine whether one or more cache ways of the bonus vector are reserved by another component cache in determination block 2414. In response to determining that one or more cache ways of the bonus vector not are reserved by another component cache (i.e., determination block 2414="No"), the computing device may reserve the unreserved cache ways for the associated component cache in block 2412. In response to determining that one or more cache ways of the bonus vector are reserved by another component cache (i.e., determination block 2414="Yes"), the commuting device may deactivate the other component cache in block 2416. In block 2412, the computing device may reserve the unreserved cache ways for the associated component cache.

Figure 25:
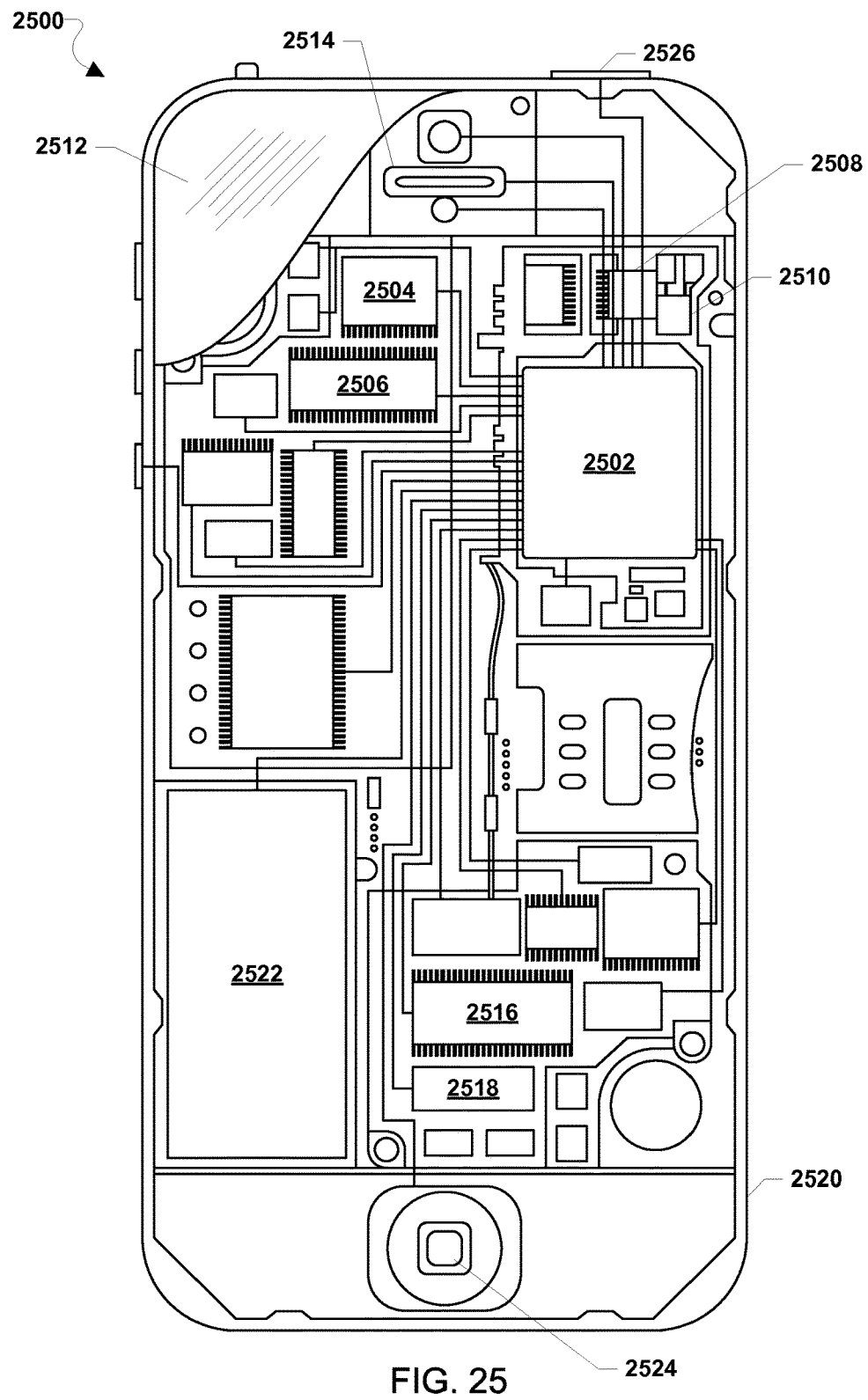
FIG. 25 is component block diagram illustrating an example mobile device suitable for use with the various aspects.

FIG. 25 illustrates an example mobile device suitable for use with the various aspects. The mobile device 2500 may include a processor 2502 coupled to a touchscreen controller 2504 and an internal memory 2506. The processor 2502 may be one or more multicore integrated circuits designated for general or specific processing tasks. The internal memory 2506 may be volatile or non-volatile memory, and may also be secure and/or encrypted memory, or unsecure and/or unencrypted memory, or any combination thereof. Examples of memory types which can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 2504 and the processor 2502 may also be coupled to a touchscreen panel 2512, such as a resistive-sensing touchscreen, capacitive-sensing touchscreen, infrared sensing touchscreen, etc. Additionally, the display of the computing device 2500 need not have touch screen capability.

The mobile device 2500 may have one or more radio signal transceivers 2508 (e.g., Peanut, Bluetooth, Zigbee, Wi-Fi, RF radio) and antennae 2510, for sending and receiving communications, coupled to each other and/or to the processor 2502. The transceivers 2508 and antennae 2510 may be used with the above-mentioned circuitry to implement the various wireless transmission protocol stacks and interfaces. The mobile device 2500 may include a cellular network wireless modem chip 2516 that enables communication via a cellular network and is coupled to the processor.

The mobile device 2500 may include a peripheral device connection interface 2518 coupled to the processor 2502. The peripheral device connection interface 2518 may be singularly configured to accept one type of connection, or may be configured to accept various types of physical and communication connections, common or proprietary, such as USB, FireWire, Thunderbolt, or PCIe. The peripheral device connection interface 2518 may also be coupled to a similarly configured peripheral device connection port (not shown).

The mobile device 2500 may also include speakers 2514 for providing audio outputs. The mobile device 2500 may also include a housing 2520, constructed of a plastic, metal, or a combination of materials, for containing all or some of the components discussed herein. The mobile device 2500 may include a power source 2522 coupled to the processor 2502, such as a disposable or rechargeable battery. The rechargeable battery may also be coupled to the peripheral device connection port to receive a charging current from a source external to the mobile device 2500. The mobile device 2500 may also include a physical button 2524 for receiving user inputs. The mobile device 2500 may also include a power button 2526 for turning the mobile device 2500 on and off.

Figure 26:
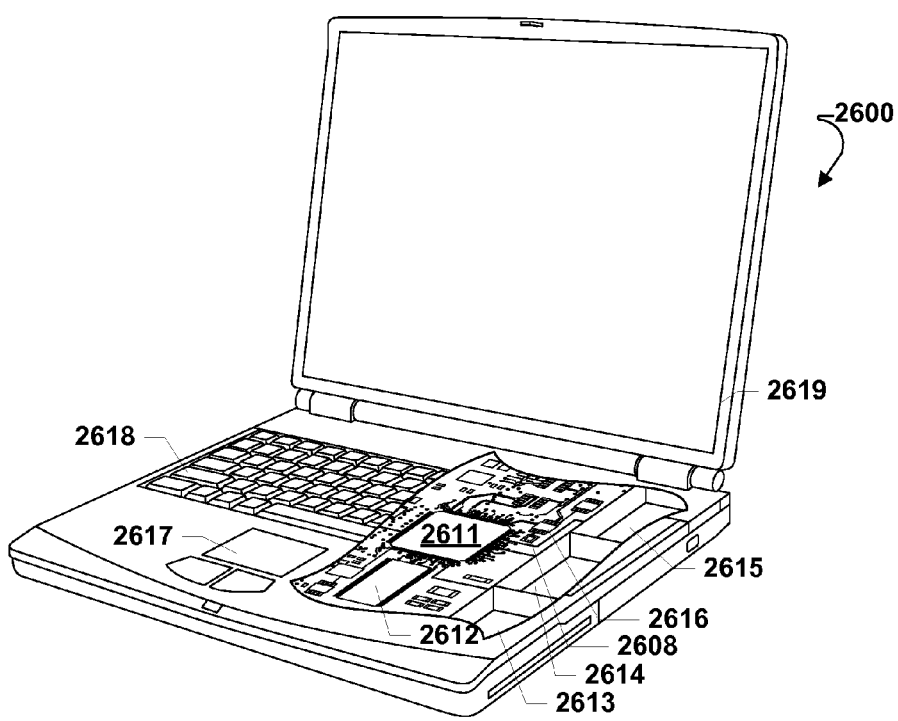
FIG. 26 is component block diagram illustrating an example mobile device suitable for use with the various aspects.

The various aspects described above may also be implemented within a variety of mobile devices, such as a laptop computer 2600 illustrated in FIG. 26. Many laptop computers include a touchpad touch surface 2617 that serves as the computer's pointing device, and thus may receive drag, scroll, and flick gestures similar to those implemented on computing devices equipped with a touch screen display and described above. A laptop computer 2600 will typically include a processor 2611 coupled to volatile memory 2612 and a large capacity nonvolatile memory, such as a disk drive 2613 of Flash memory. Additionally, the computer 2600 may have one or more antenna 2608 for sending and receiving electromagnetic radiation that may be connected to a wireless data link and/or cellular telephone transceiver 2616 coupled to the processor 2611. The computer 2600 may also include a floppy disc drive 2614 and a compact disc (CD) drive 2615 coupled to the processor 2611. In a notebook configuration, the computer housing includes the touchpad 2617, the keyboard 2618, and the display 2619 all coupled to the processor 2611. Other configurations of the computing device may include a computer mouse or trackball coupled to the processor (e.g., via a USB input) as are well known, which may also be use in conjunction with the various aspects.

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Many computing devices operating system kernels are organized into a user space (where non-privileged code runs) and a kernel space (where privileged code runs). This separation is of particular importance in Android and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

The foregoing method descriptions and the process flow diagrams are provided merely as illustrative examples and are not intended to require or imply that the operations of the various aspects must be performed in the order presented. As will be appreciated by one of skill in the art the order of operations in the foregoing aspects may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various aspects may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method for dynamically partitioning a system cache, comprising:
   receiving a system cache access request comprising a component cache identifier from a client;
   retrieving, from a component cache configuration table, a set shift trait configured to indicate a number of multiple groups of sets of the system cache and a set offset trait configured to indicate a group of sets from the multiple groups of sets and the group of sets comprising a plurality of sets of the system cache, the set shift trait and the set offset trait being correlated with the component cache identifier in the component cache configuration table; and
   activating locations in the system cache correlating to at least a portion of a group of ways of a component cache within the group of sets indicated by the set shift trait and the set offset trait.

2. The method of claim 1, wherein activating the locations in the system cache correlating to at least the portion of the group of ways of the component cache within the group of sets indicated by the set shift trait and the set offset trait comprises reserving the locations in the system cache.

3. The method of claim 2, wherein reserving the locations in the system cache comprises setting reserved indicators in a component cache reserve table for the locations in the system cache.

4. The method of claim 3, further comprising:
   updating the reserved indicators to change a number of locations reserved in the system cache correlating to an updated portion of the group of ways and the group of sets.

5. The method of claim 2, further comprising:
   updating a component cache active ways table with an indication of the portion of the group of ways of the component cache that are active, wherein reserving the locations in the system cache comprises reserving ways with the indication of the component cache active ways table.

6. The method of claim 1, further comprising:
   preventing another client from accessing the locations in the system cache.

7. The method of claim 1, further comprising:
   releasing at least a portion of the locations in the system cache; and
   deactivating locations in the system cache correlating to the released locations in the system cache.

8. The method of claim 1, wherein the component cache identifier is a first component cache identifier and the component cache is a first component cache, further comprising:
   loading a bonus vector for at least the first component cache identifier configured to indicate one or more ways for the first component cache associated with the first component cache identifier to expand into;
   receiving a reserved vector for at least the first component cache identifier configured to indicate one or more ways to be reserved for the first component cache;
   determining whether one or more ways of the reserved vector are reserved by a second component cache;
   deactivating the second component cache to unreserve the one or more ways reserved by the second component cache in response to determining that the second component cache has reserved one or more ways of the reserved vector;
   determining whether using the first component cache includes using one or more ways of the bonus vector;

determining whether one or more ways of the bonus vector are reserved by the second component cache in response to determining that a request to use the first component cache includes the use of one or more ways bonus vector;

deactivating the second component cache to unreserve the one or more ways reserved by the second component cache in response to determining that the second component cache has reserved one or more ways of the bonus vector; and reserving one or more unreserved ways for the first component cache.

9. A computing device, comprising:

a processor;

a system cache configured to provide fast access for storing and retrieving data connected to the processor;

a system cache controller communicatively connected to the processor and the system cache and configured to perform operations comprising:

receiving a system cache access request comprising a component cache identifier from a client;

retrieving, from a component cache configuration table, a set shift trait configured to indicate a number of multiple groups of sets of the system cache and a set offset trait configured to indicate a group of sets from the multiple groups of sets and the group of sets comprising a plurality of sets of the system cache, the set shift trait and the set offset trait being correlated with the component cache identifier in the component cache configuration table; and activating locations in the system cache correlating to at least a portion of a group of ways of a component cache within the group of sets indicated by the set shift trait and the set offset trait.

10. The computing device of claim 9, wherein the system cache controller is configured to perform operations such that activating the locations in the system cache correlating to at least the portion of the group of ways of the component cache within the group of sets indicated by the set shift trait and the set offset trait comprises reserving the locations in the system cache.

11. The computing device of claim 10, wherein the system cache controller is configured to perform operations such that reserving the locations in the system cache comprises setting reserved indicators in a component cache reserve table for the locations in the system cache.

12. The computing device of claim 11, wherein the system cache controller is configured to perform operations further comprising:

updating the reserved indicators to change a number of locations reserved in the system cache correlating to an updated portion of the group of ways and the group of sets.

13. The computing device of claim 10, wherein the system cache controller is configured to perform operations further comprising:

updating a component cache active ways table with an indication of the portion of the group of ways of the component cache that are active, wherein reserving the locations in the system cache comprises reserving ways with the indication of the component cache active ways table.

14. The computing device of claim 9, wherein the system cache controller is configured to perform operations further comprising:

preventing another client from accessing the locations in the system cache.

15. The computing device of claim 9, wherein the system cache controller is configured to perform operations further comprising:

releasing at least a portion of the locations in the system cache; and deactivating locations in the system cache correlating to the released locations in the system cache.

16. The computing device of claim 9, wherein the component cache identifier is a first component cache identifier and the component cache is a first component cache, and wherein the system cache controller is configured to perform operations further comprising:

loading a bonus vector for at least the first component cache identifier configured to indicate one or more ways for the first component cache associated with the first component cache identifier to expand into;

receiving a reserved vector for at least the first component cache identifier configured to indicate one or more ways to be reserved for the first component cache;

determining whether one or more ways of the reserved vector are reserved by a second component cache;

deactivating the second component cache to unreserve the one or more ways reserved by the second component cache in response to determining that the second component cache has reserved one or more ways of the reserved vector;

determining whether using the first component cache includes using one or more ways of the bonus vector;

determining whether one or more ways of the bonus vector are reserved by the second component cache in response to determining that a request to use the first component cache includes the use of one or more ways of the bonus vector;

deactivating the second component cache to unreserve the one or more ways reserved by the second component cache in response to determining that the second component cache has reserved one or more ways of the bonus vector; and reserving one or more unreserved ways for the first component cache.

17. A non-transitory processor-readable medium having stored thereon processor-executable software instructions to cause a processor and a system cache controller to perform operations comprising:

receiving a system cache access request comprising a component cache identifier from a client;

retrieving, from a component cache configuration table, a set shift trait configured to indicate a number of multiple groups of sets of a system cache and a set offset trait configured to indicate a group of sets from the multiple groups of sets and the group of sets comprising a plurality of sets of the system cache, the set shift trait and the set offset trait being correlated with the component cache identifier in the component cache configuration table; and activating locations in the system cache correlating to at least a portion of a group of ways of a component cache within the group of sets indicated by the set shift trait and the set offset trait.

18. The non-transitory processor-readable medium of claim 17, wherein the stored processor-executable software instructions are configured to cause the processor and system cache controller to perform operations such that activating the locations in the system cache correlating to at least the portion of the group of ways of the component cache within the group of sets indicated by the set shift trait and the set offset trait comprises reserving the locations in the system cache.

19. The non-transitory processor-readable medium of claim 18, wherein the stored processor-executable software instructions are configured to cause the processor and system cache controller to perform operations such that reserving the locations in the system cache comprises setting reserved indicators in a component cache reserve table for the locations in the system cache.

20. The non-transitory processor-readable medium of claim 19, wherein the stored processor-executable software instructions are configured to cause the processor and system cache controller to perform operations further comprising:
updating the reserved indicators to change a number of locations reserved in the system cache correlating to an updated portion of the group of ways and the group of sets.

21. The non-transitory processor-readable medium of claim 18, wherein the stored processor-executable software instructions are configured to cause the processor and system cache controller to perform operations further comprising:
updating a component cache active ways table with an indication of the portion of the group of ways of the component cache that are active, wherein reserving the locations in the system cache comprises reserving ways with the indication of the component cache active ways table.

22. The non-transitory processor-readable medium of claim 17, wherein the stored processor-executable software instructions are configured to cause the processor and system cache controller to perform operations further comprising:
preventing another client from accessing the locations in the system cache.

23. The non-transitory processor-readable medium of claim 17, wherein the stored processor-executable software instructions are configured to cause the processor and system cache controller to perform operations further comprising:
releasing at least a portion of the locations in the system cache; and
deactivating locations in the system cache correlating to the released locations in the system cache.

24. The non-transitory processor-readable medium of claim 17, wherein the component cache identifier is a first component cache identifier and the component cache is a first component cache, and wherein the stored processor-executable software instructions are configured to cause the processor and system cache controller to perform operations further comprising:
loading a bonus vector for at least the first component cache identifier configured to indicate one or more ways for the first component cache associated with the first component cache identifier to expand into;
receiving a reserved vector for at least the first component cache identifier configured to indicate one or more ways to be reserved for the first component cache;
determining whether one or more ways of the reserved vector are reserved by a second component cache;
deactivating the second component cache to unreserve the one or more ways reserved by the second component cache in response to determining that the second component cache has reserved one or more ways of the reserved vector;
determining whether using the first component cache includes using one or more of the ways of the bonus vector;
determining whether one or more ways of the bonus vector are reserved by the second component cache in response to determining that a request to use the first component cache includes the use of one or more ways of the bonus vector;
deactivating the second component cache to unreserve the one or more ways reserved by the second component cache in response to determining that the second component cache has reserved one or more ways of the bonus vector; and
reserving one or more unreserved ways for the first component cache.

25. A computing device, comprising:
means for receiving a system cache access request comprising a component cache identifier from a client;
means for retrieving, from a component cache configuration table, a set shift trait configured to indicate a number of multiple groups of sets of a system cache and a set offset trait configured to indicate a group of sets from the multiple groups of sets and the group of sets comprising a plurality of sets of the system cache, the set shift trait and the set offset trait being correlated with the component cache identifier in the component cache configuration table; and
means for activating locations in the system cache correlating to at least a portion of a group of ways of a component cache within the group of sets indicated by the set shift trait and the set offset trait.

26. The computing device of claim 25, wherein means for activating the locations in the system cache correlating to at least the portion of the group of ways of the component cache within the group of sets indicated by the set shift trait and the set offset trait comprises means for reserving the locations in the system cache.

27. The computing device of claim 26, wherein means for reserving the locations in the system cache comprises means for setting reserved indicators in a component cache reserve table for the locations in the system cache.

28. The computing device of claim 27, further comprising:
means for updating the reserved indicators to change a number of locations reserved in the system cache correlating to an updated portion of the group of ways and the group of sets.

29. The computing device of claim 26, further comprising:
means for updating a component cache active ways table with an indication of the portion of the group of ways of the component cache that are active, wherein means for reserving the locations in the system cache comprises means for reserving ways with the indication of the component cache active ways table.

30. The computing device of claim 25, further comprising:
means for preventing another client from accessing the locations in the system cache.

31. The computing device of claim 25, further comprising:
means for releasing at least a portion of the locations in the system cache; and
means for deactivating locations in the system cache correlating to the released locations in the system cache.

32. The computing device of claim 25, wherein the component cache identifier is a first component cache identifier and the component cache is a first component cache, further comprising:
  means for loading a bonus vector for at least the first component cache identifier configured to indicate one or more ways for the first component cache associated with the first component cache identifier to expand into;
  means for receiving a reserved vector for at least the first component cache identifier configured to indicate one or more ways to be reserved for the first component cache;
  means for determining whether one or more ways of the reserved vector are reserved by a second component cache;
  means for deactivating the second component cache to unreserve the one or more ways reserved by the second component cache in response to determining that the second component cache has reserved one or more ways of the reserved vector;
  means for determining whether using the first component cache includes using one or more ways of the bonus vector;
  means for determining whether one or more ways of the bonus vector are reserved by the second component cache in response to determining that a request to use the first component cache includes the use of one or more ways of the bonus vector;
  means for deactivating the second component cache to unreserve the one or more ways reserved by the second component cache in response to determining that the second component cache has reserved one or more ways of the bonus vector; and
  means for reserving one or more unreserved ways for the first component cache.

* * * * *